US010480829B2

(12) United States Patent
Matsuda et al.

(10) Patent No.: US 10,480,829 B2
(45) Date of Patent: Nov. 19, 2019

(54) SOLAR PANEL SUPPORT UNIT AND SOLAR POWER GENERATION SYSTEM

(71) Applicant: Kabushiki Kaisha Toshiba, Minato-ku (JP)

(72) Inventors: Takumi Matsuda, Kawasaki (JP); Kenji Fujinaga, Yokohama (JP); Yasuhiro Seki, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 289 days.

(21) Appl. No.: 15/532,201

(22) PCT Filed: Dec. 1, 2016

(86) PCT No.: PCT/JP2016/085789
§ 371 (c)(1),
(2) Date: Jun. 1, 2017

(87) PCT Pub. No.: WO2017/110411
PCT Pub. Date: Jun. 29, 2017

(65) Prior Publication Data
US 2017/0370619 A1   Dec. 28, 2017

(30) Foreign Application Priority Data

Dec. 21, 2015   (WO) .................. PCT/JP2015/085640

(51) Int. Cl.
*F24S 20/00*       (2018.01)
*F24S 20/69*       (2018.01)
(Continued)

(52) U.S. Cl.
CPC ............... *F24S 25/00* (2018.05); *F24S 25/10* (2018.05); *F24S 25/20* (2018.05); *F24S 25/63* (2018.05);
(Continued)

(58) Field of Classification Search
CPC .. F24S 20/00; F24S 20/60; F24S 20/67; F24S 20/69; F24S 2020/10–13; F24S 25/00;
(Continued)

(56) References Cited

U.S. PATENT DOCUMENTS 4,336,413 A *   6/1982   Tourneux ................ F24S 25/67
                                                 136/251
2011/0239546 A1* 10/2011 Tsuzuki .................. H02S 20/23
                                                 52/11

FOREIGN PATENT DOCUMENTS

DE    10 2004 055 187 A1    5/2006
EP         2 664 726 A1    11/2013
(Continued)

OTHER PUBLICATIONS

International Search Report dated Jan. 10, 2017 in PCT/JP2016/085789 filed Dec. 1, 2016 (with Translation of Category of Cited Documents in attached foreign language Search Report).

*Primary Examiner* — Christina Chern
(74) *Attorney, Agent, or Firm* — Oblon, McClelland, Maier & Neustadt, L.L.P.

(57) ABSTRACT

A solar panel support unit of an embodiment includes a first support member, a second support member, and a third support member. The first support member includes a first support section and a first attachment section. The first attachment section is disposed at a position spaced by a first distance from the first support section. The second support member includes a second support section and a second attachment section. The second attachment section is disposed at a position spaced by a second distance from the second support section in the panel thickness direction, the second distance being smaller than the first distance, the second attachment section having a second hole to be in communication with the first hole, the second attachment section being to overlap the first attachment section. The (Continued)

third support member includes a third support section and a third attachment section. The third attachment section has a third hole to be in communication with the first hole and the second hole, and is to overlap the second attachment section.

6 Claims, 28 Drawing Sheets

(51) Int. Cl.
*F24S 25/20* (2018.01)
*F24S 25/00* (2018.01)
*H02S 20/10* (2014.01)
*F24S 25/10* (2018.01)
*F24S 25/63* (2018.01)
*F24S 25/67* (2018.01)
*H02S 30/10* (2014.01)
*H02S 20/23* (2014.01)

(52) U.S. Cl.
CPC .............. *F24S 25/67* (2018.05); *H02S 20/10* (2014.12); *H02S 30/10* (2014.12); *H02S 20/23* (2014.12); *Y02B 10/12* (2013.01); *Y02E 10/47* (2013.01)

(58) Field of Classification Search
CPC .. F24S 25/20; E04D 3/40; H02S 20/00; H02S 20/22–25; H02S 30/00; H02S 30/10
See application file for complete search history.

(56) References Cited

FOREIGN PATENT DOCUMENTS

| | | |
|---|---|---|
| JP | 08-008188 Y2 | 3/1996 |
| JP | 2001-235235 A | 8/2001 |
| JP | 2007-192001 A | 8/2007 |
| WO | 2012/096298 A1 | 7/2012 |

\* cited by examiner

SOLAR PANEL SUPPORT UNIT AND SOLAR POWER GENERATION SYSTEM

TECHNICAL FIELD

Embodiments of the invention relate to a solar panel support unit and a solar power generation system.

BACKGROUND ART

A solar cell module of a solar power generation system includes a solar panel and a frame installed at a periphery of the solar panel. Here, the above-mentioned solar cell modules are individually fixed to stands. For this reason, the number of fixing parts to fix the solar cell modules may be increased.

PRIOR ART LITERATURE

Patent Literature

Patent document 1: Japanese Unexamined Patent Application Publication No. 2007-192001

SUMMARY OF INVENTION

Issue to be Solved by Invention

A technical problem is to provide a solar panel support unit and a solar power generation system in which reduction in the number of fixing parts can be achieved.

Means for Solving the Issue

A solar panel support unit of an embodiment includes a first support member, a second support member, and a third support member. The first support member includes a first support section and a first attachment section. The first support section is configured to support a first solar panel. The first attachment section is disposed at a position spaced by a first distance from the first support section in a panel thickness direction of the first solar panel and has a first hole. The second support member includes a second support section and a second attachment section. The second support section is configured to support a second solar panel. The second attachment section is disposed at a position spaced by a second distance from the second support section in the panel thickness direction, the second distance being smaller than the first distance, the second attachment section having a second hole to be in communication with the first hole, the second attachment section being to overlap the first attachment section. The third support member comprising a third support section and a third attachment section. The third support being configured to support a third solar panel. The third attachment section has a third hole to be in communication with the first hole and the second hole, and is to overlap the second attachment section.

MODE FOR CARRYING OUT INVENTION

Figure 1:
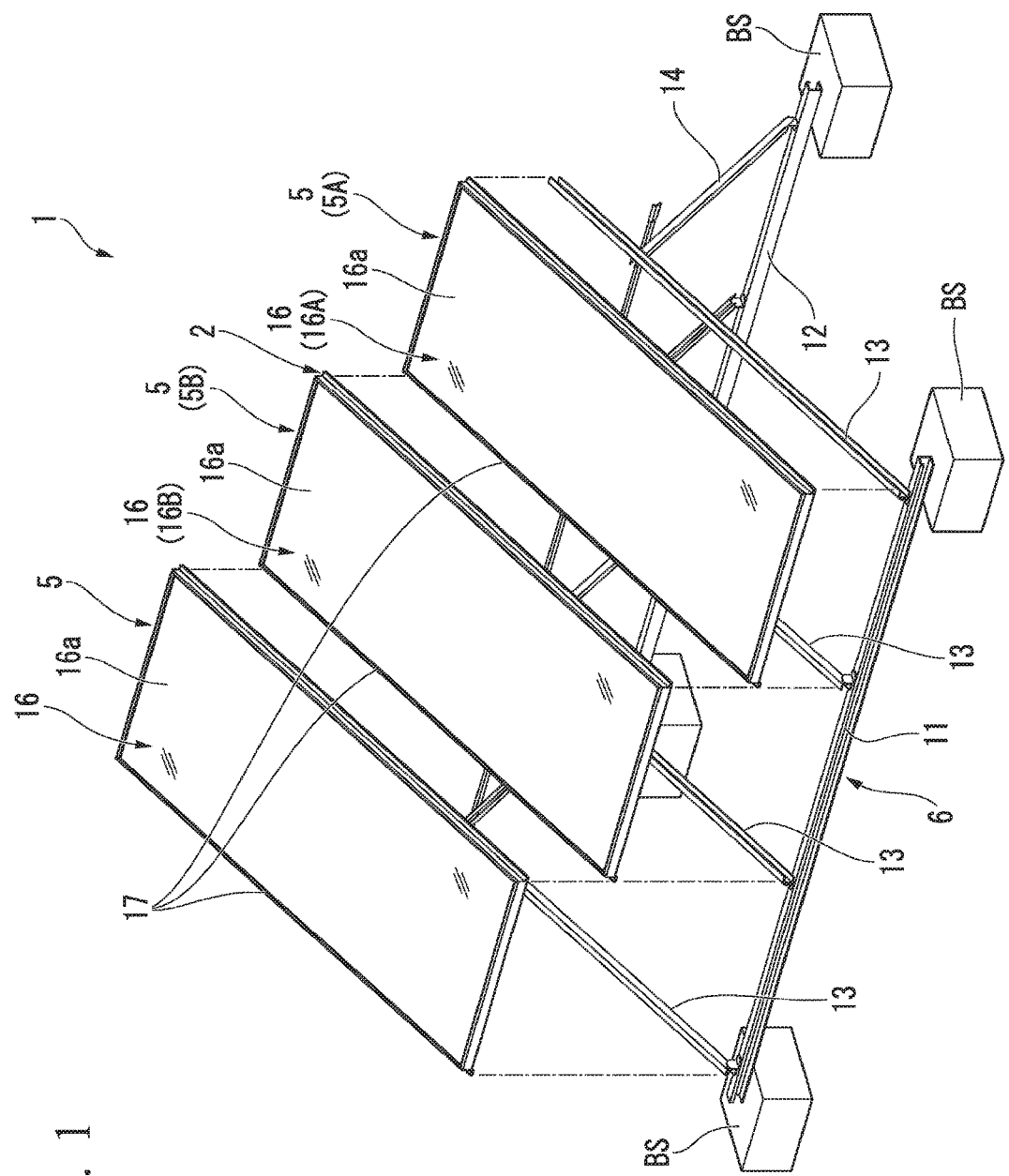
FIG. 1 is a perspective view showing a configuration example of a solar power generation system of a first embodiment.

Hereinafter, a solar panel support unit and a solar power generation system of embodiments will be described with reference to the accompanying drawings. Further, in the following description, configurations having substantially the same or similar functions are designated by the same reference numerals. Overlapping descriptions thereof may be omitted. Further, "overlap" disclosed herein includes the case in which a plurality of members overlap at least in part each other. In addition, "overlap" is not limited to the case in which a member overlaps from above but may include the case in which a member overlaps from below.

FIRST EMBODIMENT

First, a solar power generation system 1 and a solar panel support unit 2 of a first embodiment will be described with reference to FIGS. 1 to 4.

FIG. 1 is a view showing a configuration example of the solar power generation system 1 of the first embodiment.

As shown in FIG. 1, the solar power generation system 1 includes a plurality of solar cell modules 5 and a stand 6. The plurality of solar cell modules 5 are disposed adjacent to each other and attached to the stand 6.

Here, for the convenience of description, the stand 6 will be described first.

An example of the stand 6 includes a first horizontal member 11, a second horizontal member 12, main members 13 and support members 14. The first horizontal member 11 and the second horizontal member 12 are attached to a plurality of bases BS formed of, for example, concrete, and installed at a site. The main members 13 are fixed to the first horizontal member 11 in an inclined posture with respect to a horizontal direction. The solar cell modules 5 are attached to the main members 13 and supported by the main members 13. The support members 14 are installed between the second horizontal member 12 and the main members 13. The support member 14 supports the main member 13 diagonally from below.

Further, the stand 6 to which the solar cell modules 5 of the embodiment are attached is not limited to the above-mentioned example. The "stand" disclosed in this application widely means a member installed at an installation surface and to which the solar cell modules are attached. For example, the stand 6 may be a stand installed on a roof of a house. In this case, the stand 6 may be constituted by only the main member 13 directly fixed to the roof of the house.

Next, the solar cell modules 5 will be described. Further, in the embodiment, the plurality of solar cell modules 5 have substantially the same configuration.

Figure 2:
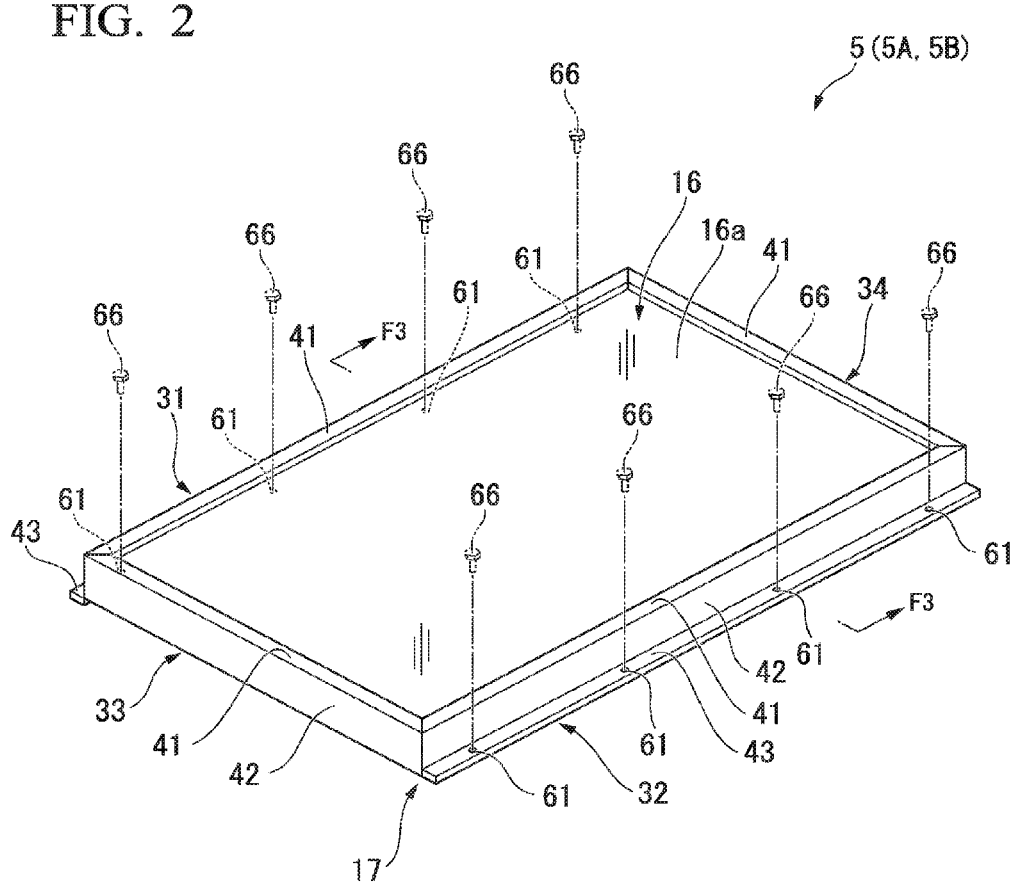
FIG. 2 is a perspective view showing a solar cell module of the first embodiment.

FIG. 2 is a perspective view showing the solar cell module 5.

As shown in FIG. 2, the solar cell module 5 includes a solar panel 16 and a frame 17 installed at a periphery of the solar panel 16. The "solar panel" disclosed in this application is a unit including a plurality of solar cells and a light transmission panel through which light passes toward the plurality of solar cells. The solar panel 16 is formed in, for example, a rectangular plate shape. On the other hand, the frame 17 is formed in a box shape surrounding four sides of the solar panel 16.

First, the solar panel 16 will be described in detail.

Figure 3:
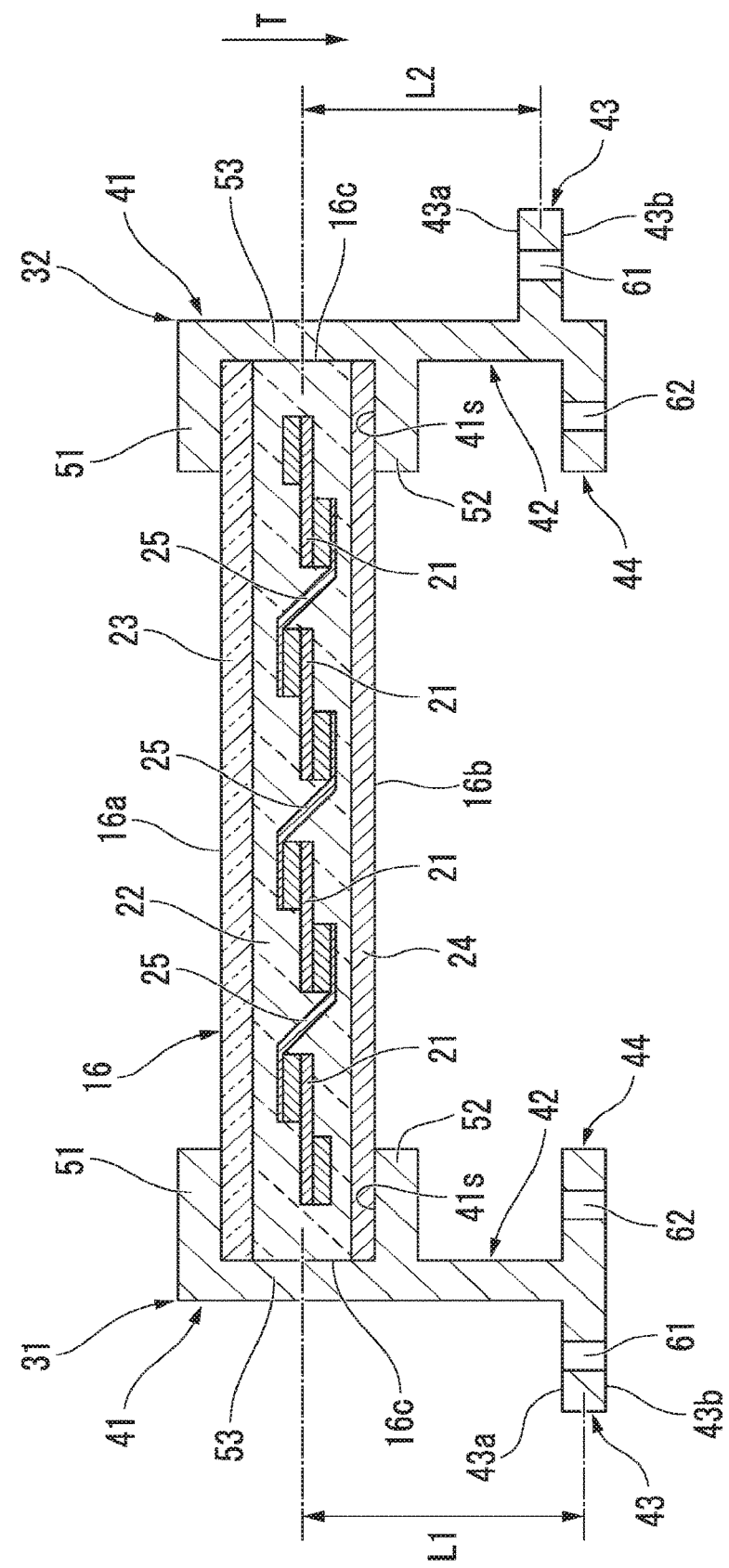
FIG. 3 is a cross-sectional view taken along line F3-F3 of the solar cell module shown in FIG. 2.

FIG. 3 is a cross-sectional view showing the solar panel 16 and the frame 17.

As shown in FIG. 3, the solar panel 16 includes a plurality of solar cells 21, a sealing material 22, a front panel 23 and a back sheet 24.

The solar cells 21 are an aggregate of semiconductor elements configured to convert light energy into electric energy by a photoelectric effect. The plurality of solar cells 21 are arranged in a plurality of directions (for example, a longitudinal direction and a direction substantially perpendicular to the longitudinal direction of the solar panel 16) in each of the solar panels 16. The plurality of solar cells 21 are electrically connected to each other by tab lines 25 or the like.

The sealing material (a sealing resin) 22 integrally seals the plurality of solar cells 21 and the tab line 25. The sealing material 22 has optical transparency.

The front panel (a protective panel) 23 is an example of the "light transmission panel." An example of the front panel 23 is a glass panel. The front panel 23 overlaps the sealing material 22 and integrally covers the plurality of solar cells 21 and the sealing material 22. The front panel 23 forms a front surface (a light receiving surface) 16a of the solar panel 16. Further, the front surface 16a of the solar panel 16 may also be referred to as "an upper surface of the solar panel." The front panel 23 has optical transparency and transmits light toward the plurality of solar cells 21.

The back sheet 24 overlaps the sealing material 22 from an opposite side of the front panel 23. The back sheet 24 forms a rear surface 16b of the solar panel 16.

Next, the frame 17 will be described in detail.

As shown in FIG. 2, the frame 17 includes a first member (a first section) 31, a second member (a second section) 32, a third member (a third section) 33 and a fourth member (a fourth section) 34. For example, the first member 31 and the second member 32 are installed along a pair of long sides of the solar panel 16. For example, the third member 33 and the fourth member 34 are installed along a pair of short sides of the solar panel 16. The first member 31, the second member 32, the third member 33 and the fourth member 34 are connected to each other. Accordingly, the frame 17 is formed in a box shape surrounding four sides of the solar panel 16. Further, the first member 31, the second member 32, the third member 33 and the fourth member 34 may also be integrally formed with each other. The frame 17 is formed of a metal material such as aluminum.

As shown in FIG. 3, each of the first member 31 and the second member 32 includes a support section 41, an erection section 42, a main attachment section 43 and a subsidiary attachment section 44.

The support section 41 is attached to a periphery (an end portion) of the solar panel 16 to support the solar panel 16. For example, the support section 41 includes a first section 51, a second section 52 and a third section 53. The first section 51 is in contact with the front surface 16a of the solar panel 16. For example, the first section 51 is in contact with the front panel 23 included in the solar panel 16 to support the front panel 23. The second section 52 is in contact with the rear surface 16b of the solar panel 16. For example, the second section 52 is in contact with the back sheet 24 included in the solar panel 16 to support the back sheet 24. The third section 53 extends along side surfaces 16c of the solar panel 16 and connects the first section 51 and the second section 52.

The support section 41 holds the solar panel 16 between the first section 51 and the second section 52. The sealing material 22, the front panel 23 and the back sheet 24 of the solar panel 16 are held by the support section 41 to be integrated with each other. Further, the third member 33 and the fourth member 34 also have substantially the same support section 41 as described above.

The erection section 42 is provided between the support section 41 and attachment sections 43 and 44 and connects the support section 41 and the attachment sections 43 and 44. The erection section 42 is formed in a plate shape substantially parallel to a thickness direction T (hereinafter referred to as a panel thickness direction T) of the solar panel 16.

The main attachment section 43 and the subsidiary attachment section 44 are sections fixed to the stand 6 by fastening members 66 (see FIG. 2) such as bolts. Further, the names "main attachment section" and "subsidiary attachment section" are given for convenience in order to discriminate the two attachment sections 43 and 44. For this reason, the terms "main" and "subsidiary" have no particular meaning, and any one of the two attachment sections 43 and 44 may be a main attachment section, and any one may also be a subsidiary attachment section.

The main attachment section 43 is formed at a lower end of the erection section 42. The main attachment section 43 protrudes from the erection section 42 away from the solar cell module 5. The main attachment section 43 is, for example, a plate-shaped rib substantially parallel to the front surface 16a of the solar panel 16. The main attachment section 43 has a hole 61 (for example, a through-hole) opened in the panel thickness direction T.

Here, as shown in FIG. 3, in the embodiment, the main attachment section 43 of the first member 31 and the main attachment section 43 of the second member 32 are provided at different levels. Specifically, the main attachment section 43 of the first member 31 is disposed at a position spaced by a first distance L1 from the support section 41 of the first member 31 in the panel thickness direction T. On the other hand, the main attachment section 43 of the second member 32 is disposed at a position spaced by a second distance L2 smaller than the first distance L1 from the support section 41 of the second member 32 in the panel thickness direction T. That is, the main attachment section 43 of the first member 31 and the main attachment section 43 of the second member 32 are disposed to be staggered with each other. For example, the second distance L2 is smaller than the first distance L1 by a thickness substantially equal to the thickness of the main attachment section 43 of the first member 31.

Here, an example of the first distance L1 is a distance in the panel thickness direction T between a center of the support section 41 of the first member 31 in the panel thickness direction T and a center of the main attachment section 43 of the first member 31 in the panel thickness direction T.

Similarly, an example of the second distance L2 is a distance in the panel thickness direction T between a center of the support section 41 of the second member 32 in the panel thickness direction T and a center of the main attachment section 43 of the second member 32 in the panel thickness direction T.

Further, definitions of the first distance L1 and the second distance L2 are not limited to the above-mentioned examples. The first distance L1 and the second distance L2 may be distances from an arbitrarily set reference line to the support section 41.

For example, in the embodiment, the second section 52 of the support section 41 of each of the first member 31 and the second member 32 has a support surface 41s to be in contact with the rear surface 16b of the solar panel 16. The main attachment section 43 of each of the first member 31 and the second member 32 has an upper surface 43a and a lower surface 43b disposed opposite to the upper surface 43a. For example, another example of the first distance L1 is a distance in the panel thickness direction T between the support surface 41s of the support section 41 of the first member 31 and the lower surface 43b of the main attachment section 43 of the first member 31. Similarly, another example of the second distance L2 is a distance in the panel thickness direction T between the support surface 41s of the support section 41 of the second member 32 and the lower surface 43b of the main attachment section 43 of the second member 32.

As shown in FIG. 3, the subsidiary attachment section 44 is formed at a lower end of the erection section 42. The subsidiary attachment section 44 protrudes from the erection section 42 in a direction opposite to the main attachment section 43. The subsidiary attachment section 44 is, for example, a plate-shaped rib substantially parallel to the front surface 16a of the solar panel 16. The subsidiary attachment section 44 has a hole 62 (for example, a through-hole) opened in the panel thickness direction T. In the embodiment, the subsidiary attachment section 44 of each of the first member 31 and the second member 32 is disposed at substantially the same level as the main attachment section 43 of the first member 31.

Next, an attachment structure of the plurality of solar cell modules 5 will be described.

Figure 4:
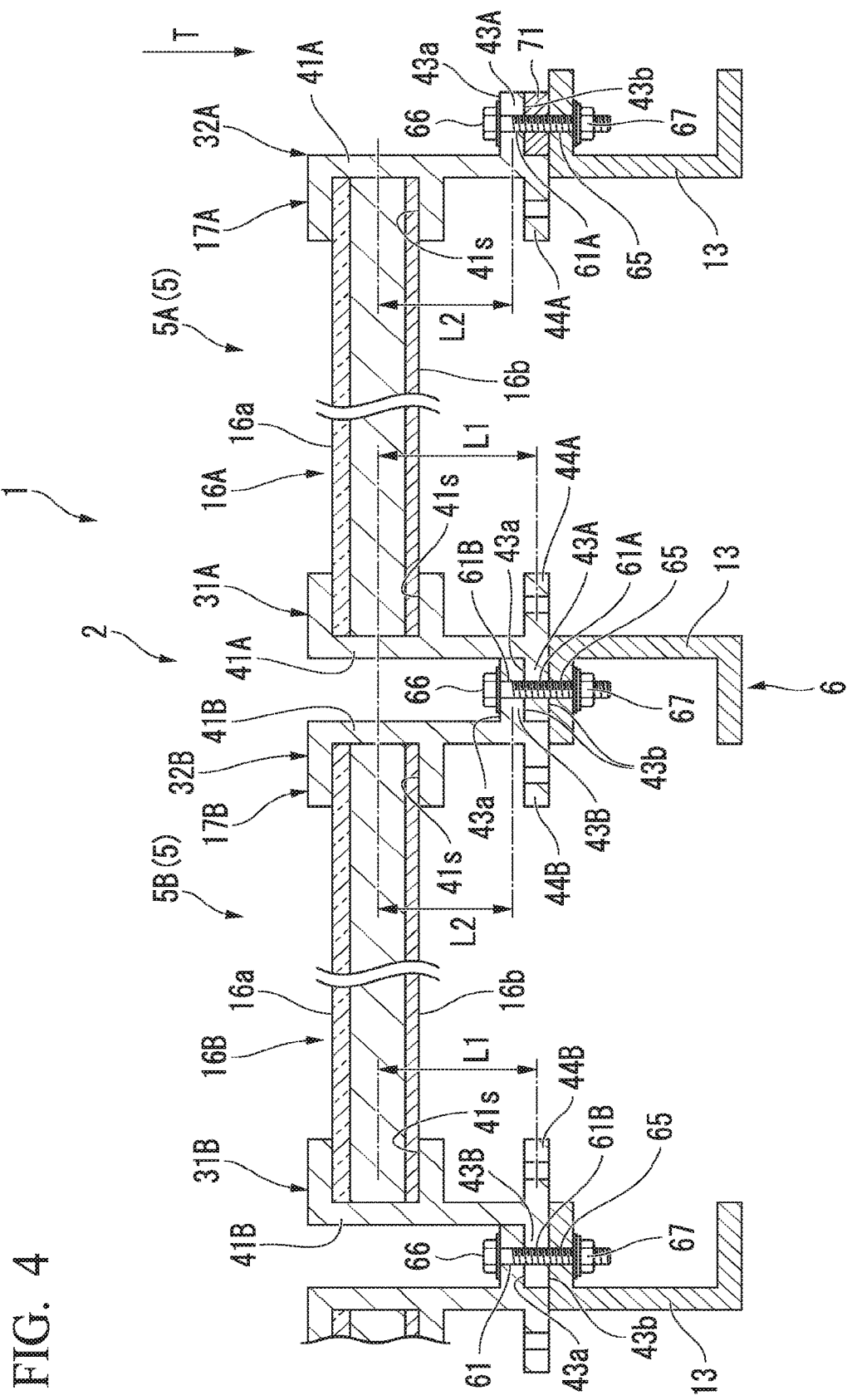
FIG. 4 is a cross-sectional view showing an attachment structure to a stand of the solar cell modules of the first embodiment.

FIG. 4 shows the plurality of solar cell modules 5 attached to the stand 6.

As shown in FIG. 4, the plurality of solar cell modules 5 include a first solar cell module 5A and a second solar cell module 5B, which are adjacent to each other. Further, in the following description, the reference numerals of components of the first solar cell module 5A are suffixed with "A." In addition, reference numerals of components of the second solar cell module 5B are suffixed with "B." The components of the first solar cell module 5A are thus distinguished from the components of the second solar cell module 5B.

As shown in FIG. 4, a main attachment section 43A of a first member 31A of the first solar cell module 5A is disposed at a position spaced by the first distance L1 from a support section 41A of the first member 31A. The main attachment section 43A of the first member 31A of the first solar cell module 5A is placed on the stand 6. The lower surface 43b of the main attachment section 43A is in contact with the stand 6.

On the other hand, a main attachment section 43B of a second member 32B of the second solar cell module 5B is disposed at a position spaced by the second distance L2, which is shorter than the first distance L1, from a support section 41B of the second member 32B. The main attachment section 43B of the second member 32B of the second solar cell module 5B is placed on the main attachment section 43A of the first member 31A of the first solar cell module 5A from an opposite side of the stand 6. Accordingly, as shown in FIG. 4, in a state that the front surface 16a of the solar panel 16A of the first solar cell module 5A is substantially flush with the front surface 16a of the solar panel 16B of the second solar cell module 5B, the main attachment section 43A of the first member 31A of the first solar cell module 5A and the main attachment section 43B of the second member 32B of the second solar cell module 5B overlap each other in the panel thickness direction T.

In addition, as shown in FIG. 4, the hole 61B of the main attachment section 43B of the second member 32B of the second solar cell module 5B is in communication with the hole 61A of the main attachment section 43A of the first member 31A of the first solar cell module 5A. In addition, the stand 6 has a hole 65 (for example, a through-hole) to be in communication with the hole 61A of the first member 31A of the first solar cell module 5A and the hole 61B of the second member 32B of the second solar cell module 5B.

The solar power generation system 1 includes the fastening members 66 such as bolts. The fastening members 66 are inserted into the hole 61A of the first member 31A of the first solar cell module 5A, the hole 61B of the second member 32B of the second solar cell module 5B, and the holes 65 of the stand 6. In the embodiment, the hole 61A of the first member 31A of the first solar cell module 5A, the hole 61B of the second member 32B of the second solar cell module 5B, and the holes 65 of the stand 6 are simple holes with no female screws. In the embodiment, nuts 67 are attached to tip portions of the fastening members 66. Accordingly, the first member 31A of the first solar cell module 5A and the second member 32B of the second solar cell module 5B are jointly fastened to the stand 6 by the fastening members 66. In addition, plain washers, spring washers, and so on, are attached to the fastening members 66.

Further, instead of the above-mentioned configuration, the holes 65 of the stand 6 may be screw holes in which female screws are formed. In this case, the nuts 67 are unnecessary. The first member 31A of the first solar cell module 5A and the second member 32B of the second solar cell module 5B may be jointly fastened to the stand 6 by engaging the fastening members 66 with the holes 65 of the stand 6.

Next, an attachment structure of another section of the solar cell modules 5A and 5B will be described.

As shown in FIG. 4, the main attachment section 43B of the first member 31B of the second solar cell module 5B is disposed at a position spaced by the first distance L1 from the support section 41B of the first member 31B. The main attachment section 43B of the first member 31B of the second solar cell module 5B is placed on the stand 6. A main attachment section 43 of a second member 32 of another solar cell module (a third solar cell module) 5 overlaps the main attachment section 43B of the first member 31B of the second solar cell module 5B from an opposite side of the stand 6.

As shown in FIG. 4, the first solar cell module 5A is disposed at an end of the plurality of solar cell modules 5. A spacer 71 is inserted between the main attachment section 43A of the second member 32A of the first solar cell module 5A and the stand 6. The main attachment section 43A of the second member 32A of the first solar cell module 5A and the spacer 71 are jointly fastened to the stand 6 by the fastening member 66.

Further, according to positions of the holes 65 of the stand 6, instead of fixing the main attachment section 43, the subsidiary attachment section 44 may be fixed to the stand 6 by the fastening member 66. When the subsidiary attachment section 44 is installed, restriction of the attachment positions of the solar cell modules 5 can be decreased.

According to the above-mentioned configuration, reduction in the number of fixing parts can be achieved. That is, in the embodiment, the solar power generation system 1 includes the solar panel support unit 2 configured to support the plurality of solar panels 16. In the embodiment, as the plurality of frames 17 included in the plurality of solar cell modules 5 cooperate with each other, an example of the solar panel support unit 2 is formed.

For example, the solar panel support unit 2 includes a first member 31A (a first support member) of the first solar cell module 5A and a second member 32B (a second support member) of the second solar cell module 5B. The first member 31A of the first solar cell module 5A includes a support section 41A (a first support section) and a main attachment section 43A (a first attachment section). The support section 41A is configured to support the solar panel 16A (a first solar panel). The main attachment section 43A is disposed at a position spaced by the first distance L1 from the support section 41A in the panel thickness direction T. The main attachment section 43A has the hole 61A (a first hole). The second member 32B of the second solar cell module 5B includes a support section 41B (a second support section) and a main attachment section 43B (a second attachment section). The support section 41B is configured to support the solar panel 16B (a second solar panel). The main attachment section 43B is disposed at a position spaced by the second distance L2, which is smaller than the first distance L1, from the support section 41B in the panel thickness direction T. The main attachment section 43B of the second member 32B has the hole 61B (a second hole) that is in communication with the hole 61A of the main attachment section 43A of the first member 31A. The main attachment section 43B of the second member 32B of the second solar cell module 5B overlaps the main attachment section 43A of the first member 31A of the first solar cell module 5A.

According to the above-mentioned configuration, the neighboring plurality of solar cell modules 5 can be fixed together by the same fastening member 66. For this reason, reduction in the number of fixing parts configured to fix the solar cell modules 5 and reduction in the number of attachment processes of the fixing parts can be achieved. Accordingly, reduction in material cost of the fixing parts and reduction in construction cost can be realized.

In the embodiment, the main attachment section 43A of the first member 31A of the first solar cell module 5A is placed on the stand 6. The main attachment section 43B of the second member 32B of the second solar cell module 5B overlaps the main attachment section 43A of the first member 31A from an opposite side of the stand 6. The main attachment section 43A of the first member 31A and the main attachment section 43B of the second member 32B are jointly fastened to the stand 6 by the fastening members 66 inserted into the hole 61A of the main attachment section 43A and the hole 61B of the main attachment section 43B.

According to the above-mentioned configuration, the neighboring plurality of solar cell modules 5 are fixed together to the stand 6 by the fastening members 66. Accordingly, reduction in the number of fixing parts and reduction in attachment processes of the fixing parts can be further achieved.

In the embodiment, each of the solar panels 16A and 16B includes the plurality of solar cells 21, the sealing material 22 that seals the plurality of solar cells 21, the front panel 23 (a light transmission panel) overlapping the sealing material 22, and the back sheet 24 overlapping the sealing material 22 from an opposite side of the front panel 23. The first member 31A of the first solar cell module 5A forms at least a portion of the frame 17A that holds the sealing material 22, the front panel 23 and the back sheet 24 of the solar panel 16A. The second member 32B of the second solar cell module 5B forms at least a portion of the frame 17B that holds the sealing material 22, the front panel 23 and the back sheet 24 of the solar panel 16B.

According to the above-mentioned configuration, the neighboring plurality of solar cell modules 5 can be fixed together by the main attachment sections 43A and 43B installed at the frames 17A and 17B that hold components of the solar panels 16A and 16B. That is, there is no need to install exclusive parts configured to fix the neighboring plurality of solar cell modules 5 together separately from the frame 17. Accordingly, a decrease in cost of the solar panel support unit 2 can be achieved.

Next, some variants of the first embodiment will be described. Further, the following variants can also be applied to second to eleventh embodiments.

(First Variant)

Figure 5:
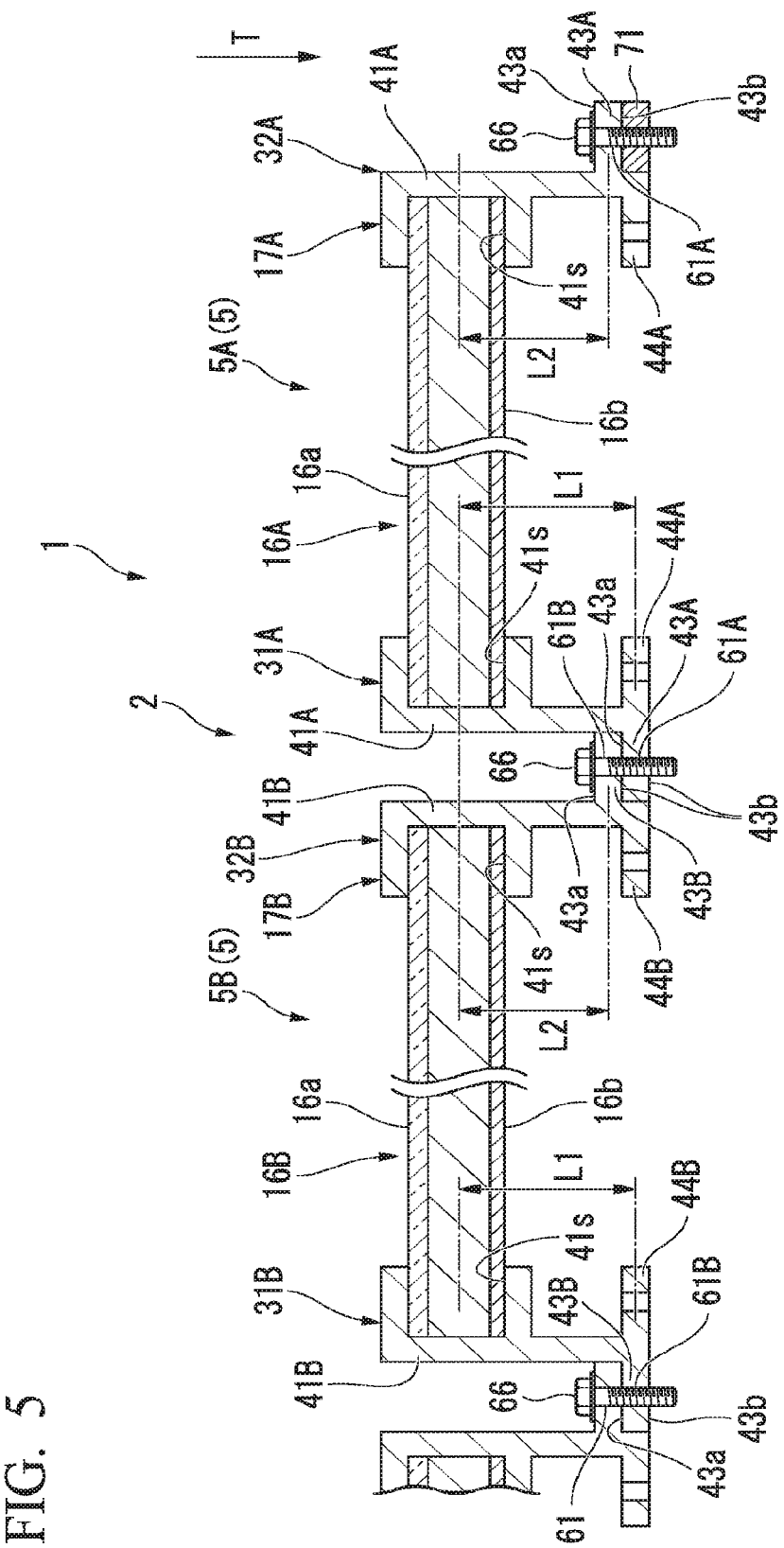
FIG. 5 is a cross-sectional view showing a first variant of the solar cell modules of the first embodiment.

FIG. 5 shows a solar panel support unit 2 of a first variant.

As shown in FIG. 5, in the variant, the hole 61A of the main attachment section 43A of the first member 31A of the first solar cell module 5A is a screw hole with a female screw. On the other hand, the hole 61B of the main attachment section 43B of the second member 32B of the second solar cell module 5B is a simple hole with no female screw. The fastening member 66 engages with the hole 61A of the main attachment section 43A of the first member 31A through the hole 61B of the main attachment section 43B of the second member 32B. Accordingly, the main attachment section 43A of the first member 31A of the first solar cell module 5A and the main attachment section 43B of the second member 32B of the second solar cell module 5B are connected.

Here, the fastening member 66 may not be attached to the hole 65 of the stand 6. That is, the "attachment section" disclosed in this application is not limited to the attachment section fixed to the stand 6 but may also be an attachment section configured to connect the plurality of solar cell modules 5.

First, in the variant (the example in which the female screw is formed in the hole 61A of the first member 31A), like the first embodiment, the fastening member 66 may also pass through the hole 65 of the stand 6. The hole 65 of the stand 6 is, for example, a simple hole with no female screw. The nut 67 is attached to the tip portion of the fastening member 66. Accordingly, the two solar cell modules 5A and 5B may also be fixed together to the stand 6.

(Second Variant)

Figure 6:
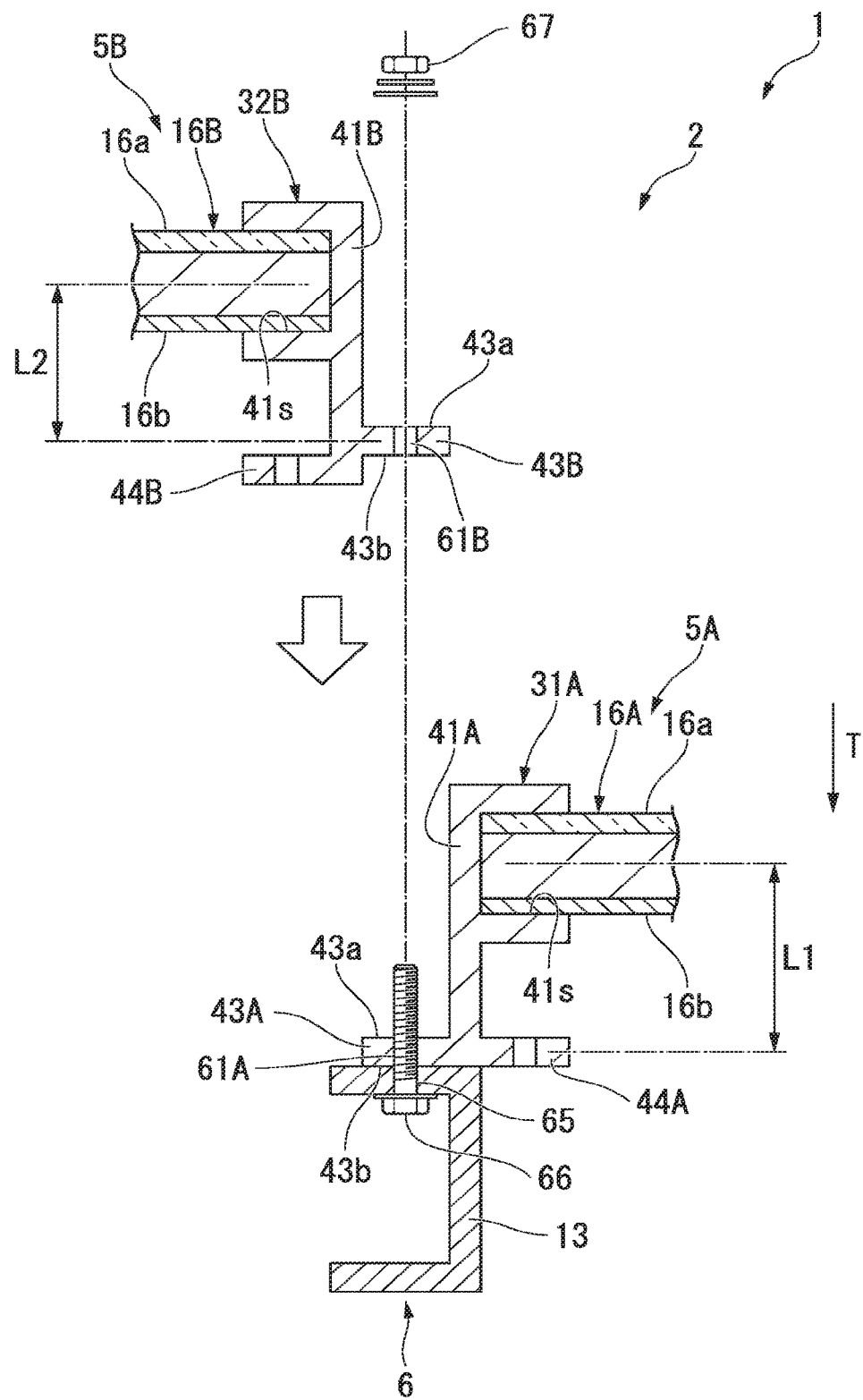
FIG. 6 is a cross-sectional view showing a second variant of the solar cell module of the first embodiment.

FIG. 6 shows a solar panel support unit 2 of a second variant.

As shown in FIG. 6, in the variant, the hole 61A of the main attachment section 43A of the first member 31A of the first solar cell module 5A, the hole 61B of the main attachment section 43B of the second member 32B of the second solar cell module 5B, and the holes 65 of the stand 6 are simple holes with no female screws. The fastening members 66 are inserted into the hole 61A of the first member 31A of the first solar cell module 5A, the hole 61B of the second member 32B of the second solar cell module 5B, and the holes 65 of the stand 6 from below.

In the above-mentioned configuration, for example, after the first solar cell module 5A is placed on the stand 6 and before the second solar cell module 5B installed, the fastening members 66 are inserted into the hole 61A of the main attachment section 43A of the first member 31A of the first solar cell module 5A and the hole 65 of the stand 6 from below. Then, the main attachment section 43B of the second member 32B of the second solar cell module 5B overlaps the main attachment section 43A of the first member 31A of the first solar cell module 5A while the fastening member 66 is used for positioning. For this reason, according to the configuration of the variant, assemblability of the solar power generation system 1 is improved.

(Third Variant)

Figure 7:
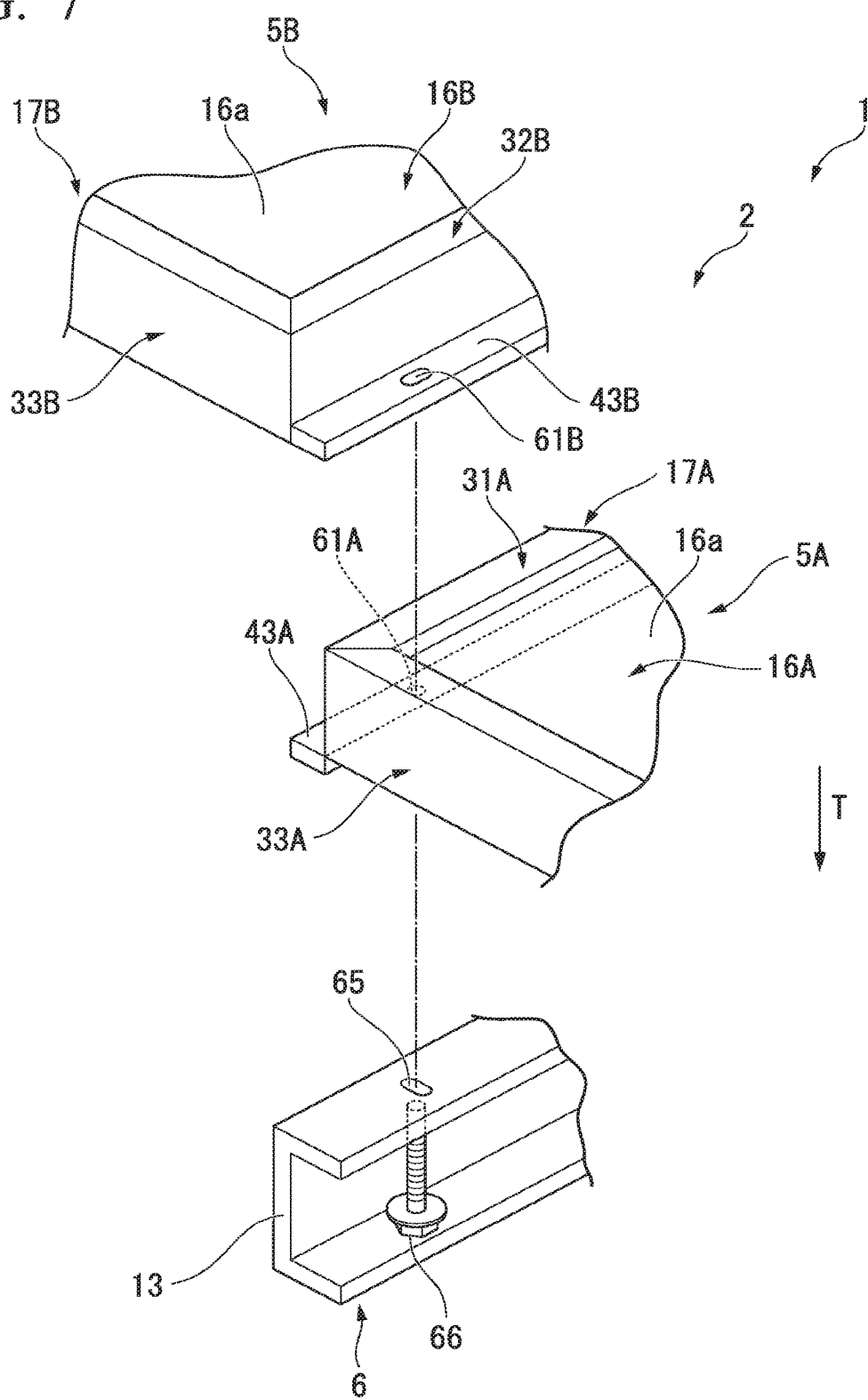
FIG. 7 is a perspective view showing a third variant of the solar cell module of the first embodiment.

FIG. 7 shows a solar panel support unit 2 of a third variant.

As shown in FIG. 7, in the variant, the hole 61A of the main attachment section 43A of the first member 31A of the first solar cell module 5A is a round hole. On the other hand, the hole 61B of the main attachment section 43B of the second member 32B of the second solar cell module 5B is a long hole. The hole 61B is, for example, a long hole that is along in a longitudinal direction of the second member 32B. Further, the hole 61B may be a long hole that is along in a direction crossing the longitudinal direction of the second member 32B.

According to the above-mentioned configuration, a manufacturing error (a dimensional tolerance) included in the first solar cell module 5A and the second solar cell module 5B can be absorbed by the hole 61B of the second member 32B, which is the long hole. Accordingly, assemblability of the solar power generation system 1 is improved.

Further, the hole 65 of the stand 6 may be a long hole along in a direction crossing the longitudinal direction of the hole (long hole) 61B of the second member 32B of the second solar cell module 5B. According to the above-mentioned configuration, a dimensional tolerance in a plurality of directions can be absorbed. In addition, instead of at least one of the hole 61B of the second member 32B of the second solar cell module 5B and the hole 65 of the stand 6, the hole 61A of the main attachment section 43A of the first member 31A of the first solar cell module 5A may also be a long hole.

SECOND EMBODIMENT

Next, a second embodiment will be described with reference to FIG. 8. The embodiment is different from the first embodiment in that the frame 17A of the first solar cell module 5A and the frame 17B of the second solar cell module 5B have different shapes. Note that, the other configurations of the embodiment are the same as the configurations of the first embodiment.

The solar power generation system 1 of the embodiment includes the plurality of first solar cell modules 5A and the plurality of second solar cell modules 5B. The plurality of first solar cell modules 5A and the plurality of second solar cell modules 5B are alternately disposed.

Figure 8:
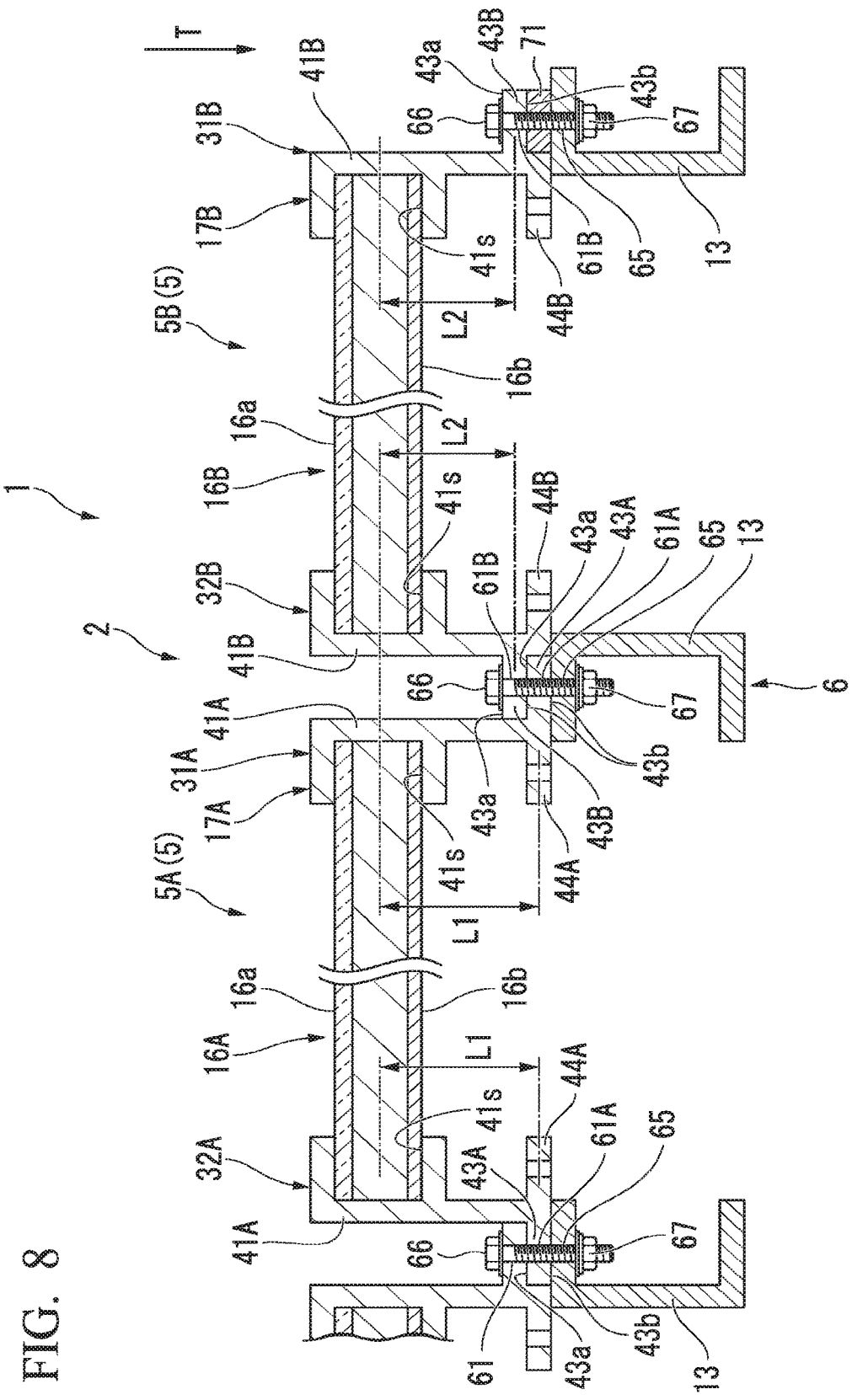
FIG. 8 is a cross-sectional view showing solar cell modules of a second embodiment.

As shown in FIG. 8, the main attachment section 43A of each of the first member 31A and the second member 32A of the first solar cell module 5A is disposed at a position spaced by the first distance L1 from the support section 41A in the panel thickness direction T.

On the other hand, the main attachment section 43B of each of the first member 31B and the second member 32B of the second solar cell module 5B is disposed at a position spaced by the second distance L2 from the support section 41B in the panel thickness direction T.

Even in the above-mentioned configuration, in a state that the front surface 16a of the solar panel 16A of the first solar cell module 5A is substantially flush with the front surface 16a of the solar panel 16B of the second solar cell module 5B, the main attachment section 43A of the first member 31A of the first solar cell module 5A and the main attachment section 43B of the second member 32B of the second solar cell module 5B overlap each other in the panel thickness direction T. For this reason, like the first embodiment, reduction in the number of fixing parts can be achieved.

THIRD EMBODIMENT

Next, a third embodiment will be described with reference to FIGS. 9 to 11. The embodiment is different from the first embodiment in that the main attachment sections 43A, 43B, 43C and 43D of the four solar cell modules 5A, 5B, 5C and 5D overlap one another. Note that, the other configurations of the embodiment are the same as the configurations of the first embodiment.

Figure 9:
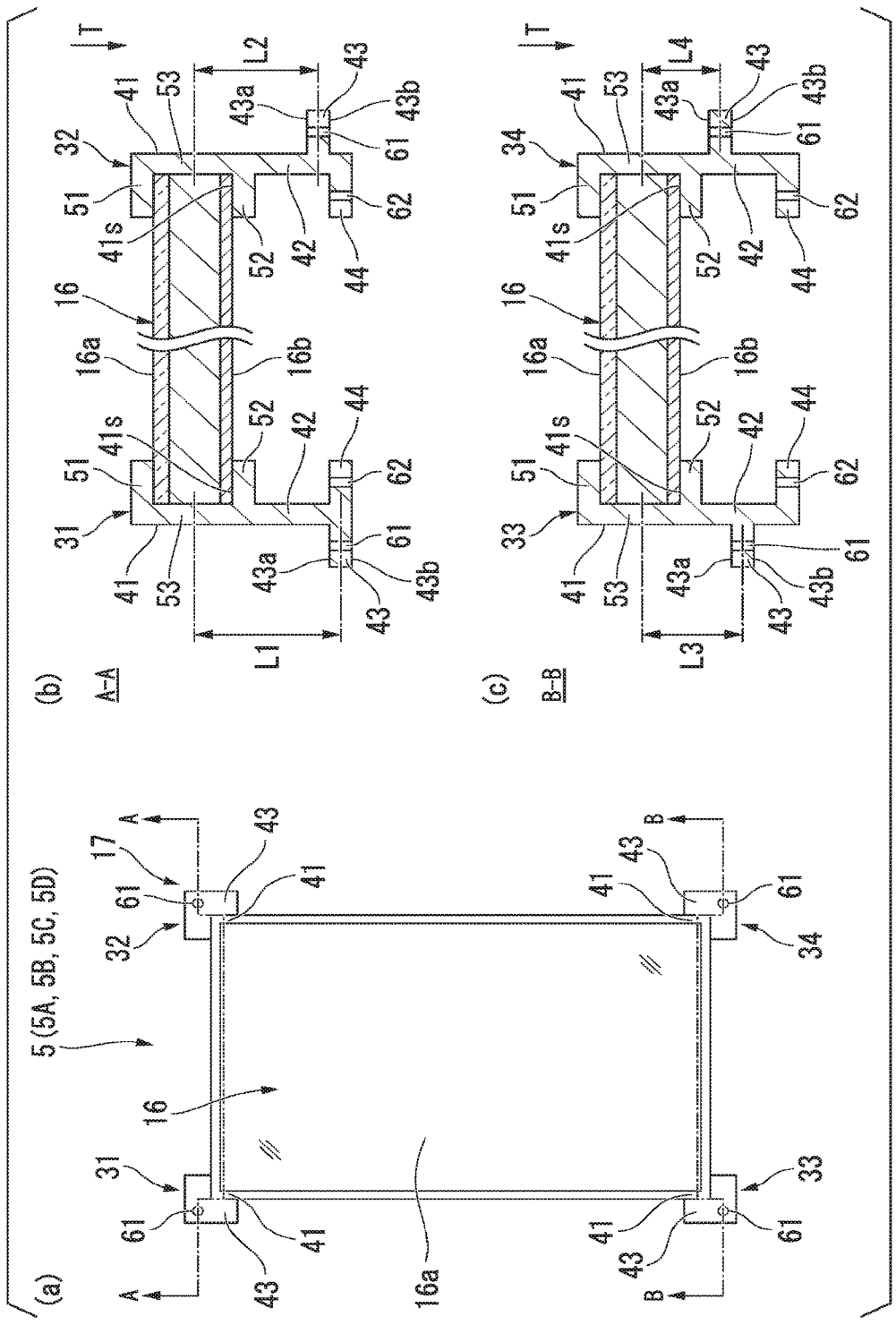
FIG. 9 is a view showing a solar cell module of a third embodiment.

FIG. 9 shows the solar cell module 5 of the embodiment. Further, (a) in FIG. 9 is a plan view of the solar cell module 5. (b) in FIG. 9 is a cross-sectional view taken along line A-A of the solar cell module 5 shown in (a) in FIG. 9. (c) in FIG. 9 is a cross-sectional view taken along line B-B of the solar cell module 5 shown in (a) in FIG. 9.

As shown in FIG. 9, the frame 17 of the solar cell module 5 of the embodiment includes a first member (a first section)

31, a second member (a second section) 32, a third member (a third section) 33 and a fourth member (a fourth section) 34. As in the first embodiment, each of the first member 31, the second member 32, the third member 33 and the fourth member 34 includes a support section 41, an erection section 42, a main attachment section 43 and a subsidiary attachment section 44.

The support sections 41 of the first member 31, the second member 32, the third member 33 and the fourth member 34 are, for example, integrally formed with each other. Accordingly, the frame 17 is formed in a box shape surrounding four sides of the solar panel 16. Further, the support sections 41 of the first member 31, the second member 32, the third member 33 and the fourth member 34 may be formed separately from each other and then connected to each other.

In the embodiment, the main attachment sections 43 and the subsidiary attachment sections 44 of the first member 31, the second member 32, the third member 33 and the fourth member 34 are divided and disposed at four corners (nooks) of the solar panel 16. The main attachment sections 43 and the subsidiary attachment sections 44 of the first member 31, the second member 32, the third member 33 and the fourth member 34 are, for example, integrally formed with the support section 41. Further, the main attachment sections 43 and the subsidiary attachment sections 44 of the first member 31, the second member 32, the third member 33 and the fourth member 34 may be formed separately from the support section 41 and then connected to the support section 41.

As shown in FIG. 9, in the embodiment, the main attachment sections 43 of the first member 31, the second member 32, the third member 33 and the fourth member 34 are provided at different levels.

Specifically, the main attachment section 43 of the first member 31 is disposed at a position spaced by the first distance L1 from the support section 41 of the first member 31 in the panel thickness direction T. The main attachment section 43 of the second member 32 is disposed at a position spaced by the second distance L2, which is smaller than the first distance L1, from the support section 41 of the second member 32 in the panel thickness direction T. The main attachment section 43 of the third member 33 is disposed at a position spaced by a third distance L3, which is smaller than the second distance L2, from the support section 41 of the third member 33 in the panel thickness direction T. The main attachment section 43 of the fourth member 34 is disposed at a position spaced by a fourth distance L4, which is smaller than the third distance L3, from the support section 41 of the fourth member 34 in the panel thickness direction T.

Further, examples of definitions of the first distance L1, the second distance L2, the third distance L3 and the fourth distance L4 are the same as in the first embodiment. For example, definitions of the first distance L1 and the second distance L2 are the same as in the first embodiment.

In addition, an example of the third distance L3 is a distance in the panel thickness direction T between a center of the support section 41 of the third member 33 in the panel thickness direction T and a center of the main attachment section 43 of the third member 33 in the panel thickness direction T. An example of the fourth distance L4 is a distance in the panel thickness direction T between a center of the support section 41 of the fourth member 34 in the panel thickness direction T and a center of the main attachment section 43 of the fourth member 34 in the panel thickness direction T.

In addition, another example of the third distance L3 is a distance in the panel thickness direction T between the support surface 41s of the support section 41 of the third member 33 and the lower surface 43b of the main attachment section 43 of the third member 33. Another example of the fourth distance L4 is a distance in the panel thickness direction T between the support surface 41s of the support section 41 of the fourth member 34 and the lower surface 43b of the main attachment section 43 of the fourth member 34.

Next, an attachment structure of the plurality of solar cell modules 5 will be described.

Figure 10:
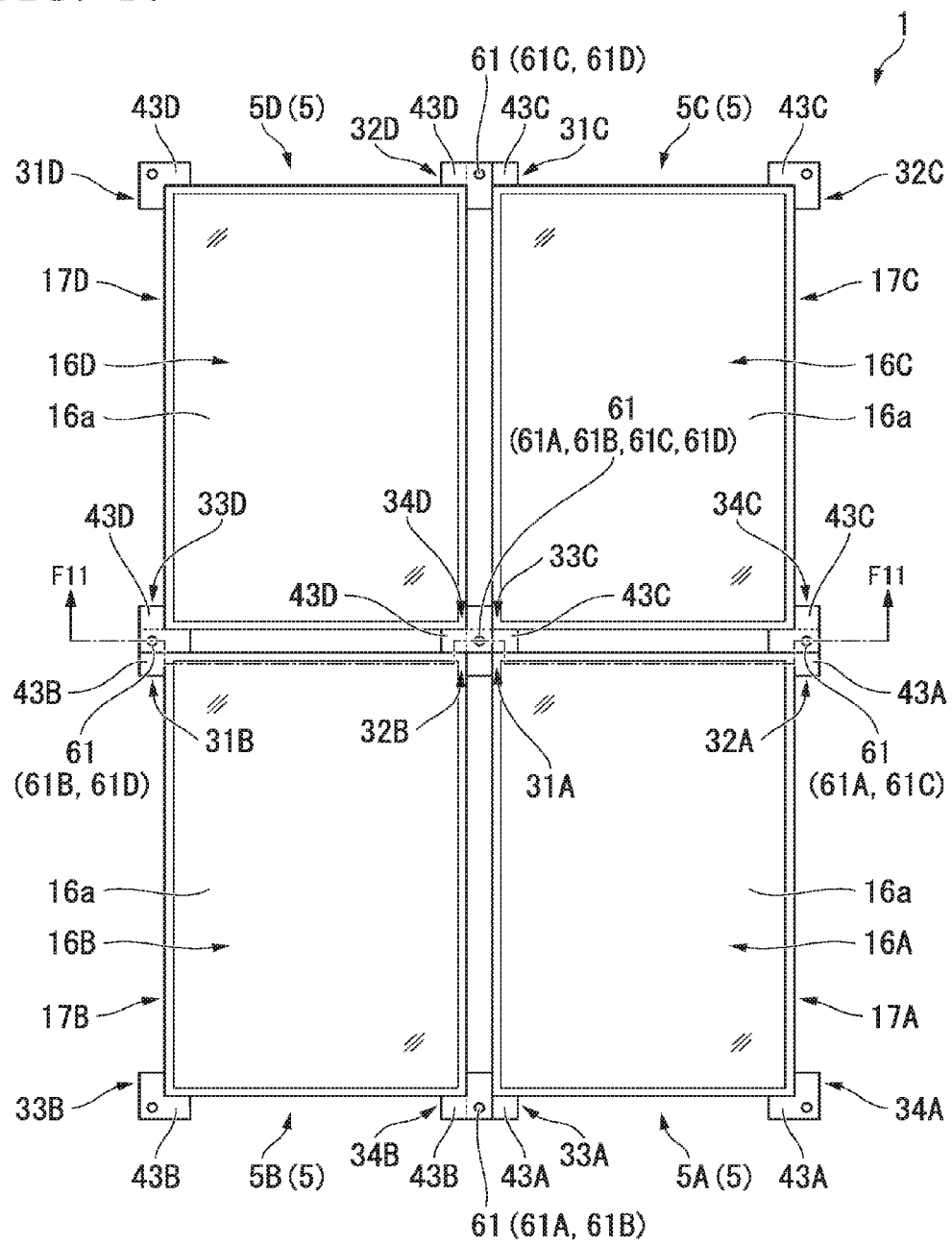
FIG. 10 is a plan view showing disposition of the solar cell modules of the third embodiment.

FIG. 10 shows the plurality of solar cell modules 5 attached to the stand 6. As shown in FIG. 10, the plurality of solar cell modules 5 include the first solar cell module 5A, the second solar cell module 5B, the third solar cell module 5C and the fourth solar cell module 5D. The four solar cell modules 5A, 5B, 5C and 5D are arranged in a plurality of directions (for example, a longitudinal direction of the solar panel 16 and a direction substantially perpendicular to the longitudinal direction). Further, in the embodiment, the four solar cell modules 5A, 5B, 5C and 5D have substantially the same configuration.

Further, in the following description, reference numerals of components of the first solar cell module 5A are suffixed with "A." Reference numerals of components of the second solar cell module 5B are suffixed with "B." Reference numerals of components of the third solar cell module 5C are suffixed with "C." Reference numerals of components of the fourth solar cell module 5D are suffixed with "D." The components of the four solar cell modules 5A, 5B, 5C and 5D are thus distinguished.

Figure 11:
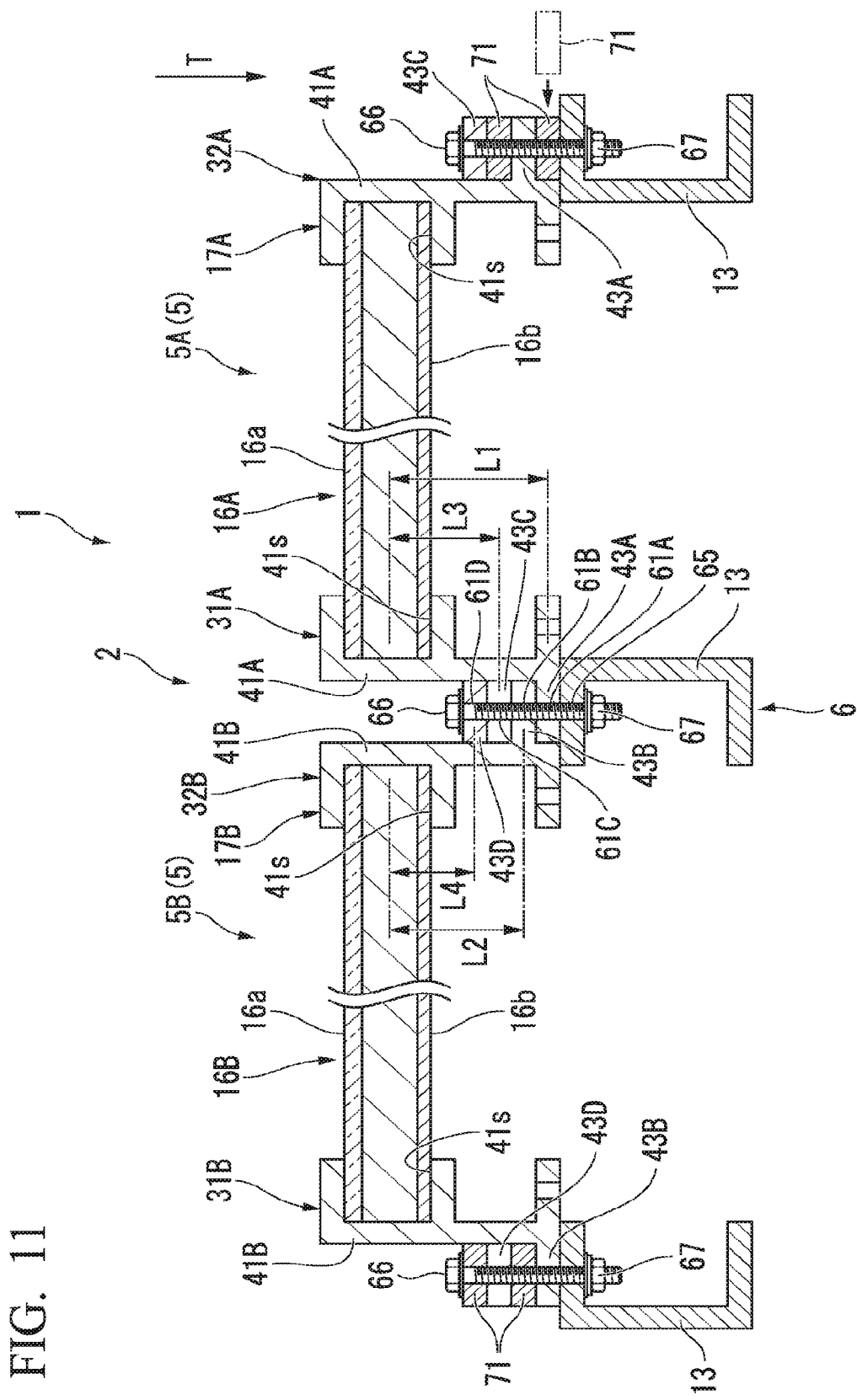
FIG. 11 is a cross-sectional view taken along line F11-F11 of the solar cell modules shown in FIG. 10.

FIG. 11 shows a cross-section taken along line F11-F11 of the solar cell modules 5A, 5B, 5C and 5D shown in FIG. 10.

As shown in FIG. 11, the main attachment section 43A of the first member 31A of the first solar cell module 5A is placed on the stand 6.

The main attachment section 43B of the second member 32B of the second solar cell module 5B is placed on (overlaps) the main attachment section 43A of the first member 31A of the first solar cell module 5A from an opposite side of the stand 6.

The main attachment section 43C of the third member 33C of the third solar cell module 5C is placed on (overlaps) the main attachment section 43B of the second member 32B of the second solar cell module 5B from an opposite side of the stand 6.

The main attachment section 43D of the fourth member 34D of the fourth solar cell module 5D is placed on (overlaps) the main attachment section 43C of the third member 33C of the third solar cell module 5C from an opposite side of the stand 6.

Accordingly, the main attachment sections 43A, 43B, 43C and 43D of the four solar cell modules 5A, 5B, 5C and 5D overlap one another in the panel thickness direction T in a state that the front surfaces 16a of the solar panels 16A, 16B, 16C and 16D of the four solar cell modules 5A, 5B, 5C and 5D are substantially flush with one another. The holes 61A, 61B, 61C and 61D of the main attachment sections 43A, 43B, 43C and 43D of the four solar cell modules 5A, 5B, 5C and 5D is in communication with one another. The main attachment sections 43A, 43B, 43C and 43D of the four solar cell modules 5A, 5B, 5C and 5D are jointly fastened to the stand 6 by the fastening members 66 inserted through the holes 61A, 61B, 61C and 61D.

As described above, in the embodiment, the solar panel support unit 2 includes the third member 33C (a third support member) of the third solar cell module 5C. The third member 33C includes the support section 41C (a third support section) and the main attachment section 43C (a third attachment section). The support section 41C is configured to support the solar panel 16C (a third solar panel). The main attachment section 43C is disposed at a position spaced by the third distance L3, which is smaller than the second distance L2, from the support section 41C in the panel thickness direction T. The main attachment section 43C of the third member 33C of the third solar cell module 5C overlaps the main attachment sections 43A and 43B of the first member 31A of the first solar cell module 5A and the second member 32B of the second solar cell module 5B. The main attachment section 43C of the third member 33C of the third solar cell module 5C has the hole 61C (a third hole) that is in communication with the holes 61A and 61B of the main attachment sections 43A and 43B of the first member 31A of the first solar cell module 5A and the second member 32B of the second solar cell module 5B.

Further, in the embodiment, the solar panel support unit 2 includes the fourth member 34D (a fourth support member) of the fourth solar cell module 5D. The fourth member 34D includes a support section 41D (a fourth support section) and a main attachment section 43D (a fourth attachment section). The support section 41D is configured to support the solar panel 16D (a fourth solar panel). The main attachment section 43D is disposed at a position spaced by the fourth distance L4, which is smaller than the third distance L3, from the support section 41D in the panel thickness direction T. The main attachment section 43D of the fourth member 34C of the fourth solar cell module 5D overlaps the main attachment sections 43A, 43B and 43C of the first member 31A of the first solar cell module 5A, the second member 32B of the second solar cell module 5B and the third member 33C of the third solar cell module 5C. The main attachment section 43D of the fourth member 34D of the fourth solar cell module 5D has the hole 61D (a fourth hole) that is in communication with the holes 61A, 61B and 61C of the main attachment sections 43A, 43B and 43C of the first member 31A of the first solar cell module 5A, the second member 32B of the second solar cell module 5B and the third member 33C of the third solar cell module 5C.

According to the above-mentioned configuration, the four solar cell modules 5A, 5B, 5C and 5D can be fixed together by the same fastening member 66. Accordingly, reduction in the number of fixing parts can be further achieved.

FOURTH EMBODIMENT

Next, a fourth embodiment will be described with reference to FIGS. 12 and 13. The embodiment is different from the third embodiment in that identifications are provided at the main attachment sections 43 of the first to fourth members 31, 32, 33 and 34. Note that, the other configurations of the embodiment are the same as the configurations of the third embodiment.

Figure 12:
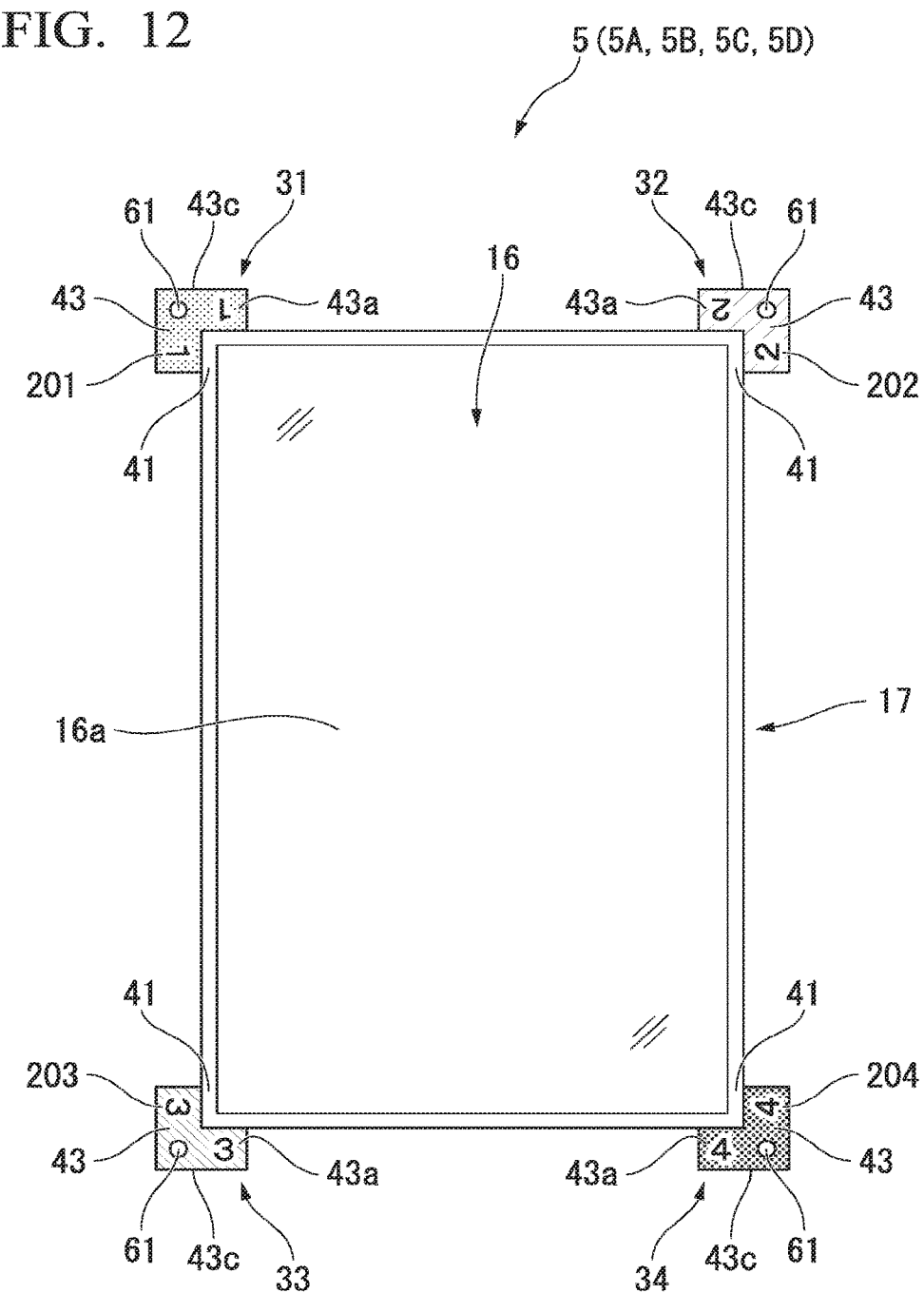
FIG. 12 is a plan view showing a solar cell module of a fourth embodiment.

FIG. 12 is a plan view showing the solar cell modules 5 (for example, the first to fourth solar cell modules 5A, 5B, 5C and 5D) of the embodiment.

As shown in FIG. 12, the frame 17 of the solar cell module 5 of the embodiment includes the first member (a first section) 31, the second member (a second section) 32, the third member (a third section) 33 and the fourth member (a fourth section) 34. In the embodiment, the main attachment section 43 (a first attachment section) of the first member 31 has a first identification 201. The main attachment section 43 (a second attachment section) of the second member 32 has a second identification 202. The main attachment section 43 (a third attachment section) of the third member 33 has a third identification 203. The main attachment section 43 (a fourth attachment section) of the fourth member 34 has a fourth identification 204.

The first identification 201 includes a mark (a sign) indicating, for example, the numeral 1. The second identification 202 includes a mark indicating, for example, the numeral 2. The third identification 203 includes a mark indicating, for example, the numeral 3. The fourth identification 204 includes a mark indicating, for example, the numeral 4. Accordingly, the first to fourth identifications 201, 202, 203 and 204 are visually different from one another and can be distinguished by their appearance. Further, instead of the above-mentioned visual aspect or in addition to the above-mentioned visual aspect, the first to fourth identifications 201, 202, 203 and 204 may differ in the visual aspect by providing different colors, patterns, or the like. In other words, in the first to fourth identifications 201, 202, 203 and 204, at least one of the number, color, pattern, and so on, may be different from one another.

The main attachment sections 43 of the first to fourth members 31, 32, 33 and 34 have side surfaces 43c. The side surfaces 43c are surfaces extending between the upper surface 43a and the lower surface 43b of the main attachment section 43, and for example, surfaces along the panel thickness direction T. The side surfaces 43c of the main attachment sections 43 of the first to fourth members 31, 32, 33 and 34 are sections that are not covered by the main attachment sections 43 when the plurality of solar cell modules 5 (for example, the first to fourth solar cell modules 5A, 5B, 5C and 5D) overlap as in the third embodiment.

At least a part of the first identification 201 is provided on the side surface 43c of the main attachment section 43 of the first member 31. At least a part of the second identification 202 is provided on the side surface 43c of the main attachment section 43 of the second member 32. At least a part of the third identification 203 is provided on the side surface 43c of the main attachment section 43 of the third member 33. At least a part of the fourth identification 204 is provided on the side surface 43c of the main attachment section 43 of the fourth member 34. In other words, in the side surfaces 43c of the main attachment sections 43 of the first to fourth members 31, 32, 33 and 34, at least one of the number, color, pattern, and so on, is different from one another.

Figure 13:
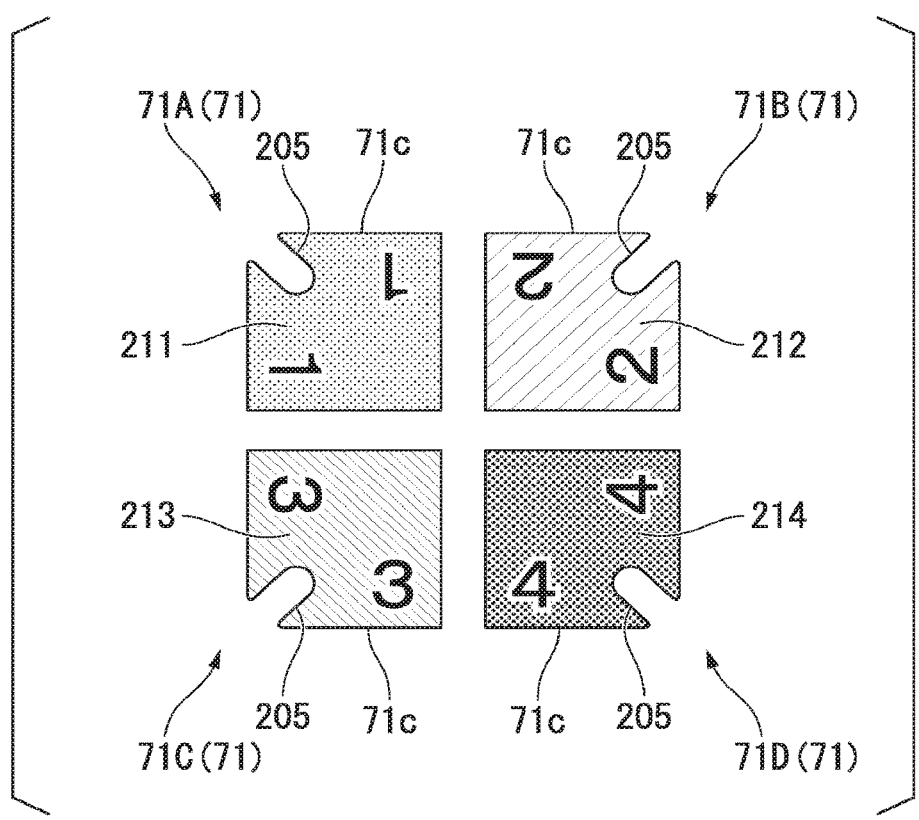
FIG. 13 is a plan view showing spacers of the fourth embodiment.

FIG. 13 is a plan view showing spacers 71A, 71B, 71C and 71D of the embodiment. As shown in FIG. 13, for example, the solar panel support unit 2 of the embodiment includes at least one of a first spacer 71A, a second spacer 71B, a third spacer 71C and a fourth spacer 71D. Each of the first to fourth spacers 71A, 71B, 71C and 71D has an insertion section 205 through which the fastening member 66 passes. The insertion section 205 is a cutout portion or a hole formed in each of the spacers 71A, 71B, 71C and 71D.

The first spacer 71A is a spacer corresponding to the main attachment section 43 (a first attachment section) of the first member 31. The first spacer 71A is installed instead of the main attachment section 43 of the first member 31 at a place at which the main attachment section 43 of the first member 31 is not present, and overlaps the main attachment section 43 of the second member 32 of another solar cell module 5 or the like. For example, the first spacer 71A is inserted between the main attachment section 43 of the second member 32 of another solar cell module 5 and the stand 6. The second spacer 71B is a spacer corresponding to the main attachment section 43 (a second attachment section) of the second member 32. The second spacer 71B is installed instead of the main attachment section 43 of the second member 32 at a place at which the main attachment section 43 of the second member 32 is not present, and overlaps the main attachment section 43 of the first member 31 of another solar cell module 5 and the main attachment section 43 of the third member 33 of further another solar cell module 5. For example, the second spacer 71B is inserted between the main attachment section 43 of the first member 31 of another solar cell module 5 and the main attachment section 43 of the third member 33 of further another solar cell module 5. The third spacer 71C is a spacer corresponding to the main attachment section 43 (a third attachment section) of the third member 33. The third spacer 71C is installed instead of the main attachment section 43 of the third member 33 at a place at which the main attachment section 43 of the third member 33 is not present and overlaps the main attachment section 43 of the second member 32 of another solar cell module 5 and the main attachment section 43 of the fourth member 34 of further another solar cell module 5. For example, the third spacer 71C is inserted between the main attachment section 43 of the second member 32 of another solar cell module 5 and the main attachment section 43 of the fourth member 34 of further another solar cell module 5. The fourth spacer 71D is a spacer corresponding to the main attachment section 43 (a fourth attachment section) of the fourth member 34. The fourth spacer 71D is installed instead of the main attachment section 43 of the fourth member 34 at a place at which the main attachment section 43 of the fourth member 34 is not present and overlaps the main attachment section 43 of the third member 33 of another solar cell module 5 or the like. For example, the fourth spacer 71D is placed on the main attachment section 43 of the third member 33 of another solar cell module 5.

In the embodiment, an identification 211 substantially the same as the first identification 201 is provided on the first spacer 71A. For example, in the identification 211 of the first spacer 71A, at least one of the number, color, pattern, and so on, is substantially the same as that of the first identification 201. An identification 212 substantially the same as the second identification 202 is provided on the second spacer 71B. For example, in the identification 212 of the second spacer 71B, at least one of the number, color, pattern, and so on, is substantially the same as that of the second identification 202. An identification 213 substantially the same as the third identification 203 is provided on the third spacer 71C. For example, in the identification 213 of the third spacer 71C, at least one of the number, color, pattern, and so on, is substantially the same as that of the third identification 203. An identification 214 substantially the same as the fourth identification 204 is provided on the fourth spacer 71D. For example, in the identification 214 of the fourth spacer 71D, at least one of the number, color, pattern, and so on, is substantially the same as that of the fourth identification 204.

As shown in FIG. 13, the first to fourth spacers 71A, 71B, 71C and 71D have side surfaces 71c. The side surfaces 71c are, for example, surfaces along the panel thickness direction T, and surfaces extending substantially parallel to the side surfaces 43c of the main attachment sections 43. At least a part of the identification 211 is provided on the side surface 71c of the first spacer 71A. At least a part of the identification 212 is provided on the side surface 71c of the second spacer 71B. At least a part of the identification 213 is provided on the side surface 71c of the third spacer 71C. At least a part of the identification 214 is provided on the side surface 71c of the fourth spacer 71D. In other words, in the side surfaces 71c of the first to fourth spacers 71A, 71B, 71C and 71D, at least one of the number, color, pattern, and so on, is different from one another.

Here, when heights of the main attachment sections 43 of the first to fourth members 31, 32, 33 and 34 are different from one another, if orientations of the solar cell modules 5 are not constantly arranged, the plurality of solar cell modules 5 cannot be assembled. Here, in the embodiment, the main attachment sections 43 of the first to fourth members 31, 32, 33 and 34 have the first to fourth identifications 201, 202, 203 and 204 differing in a visual aspect. For this reason, a worker who installs the solar cell modules 5 can easily check orientations of the solar cell modules 5 during installation by viewing at least one of the first to fourth identifications 201, 202, 203 and 204. Accordingly, the plurality of solar cell modules 5 can be easily arranged in a constant orientation. Accordingly, assemblability of the plurality of solar cell modules 5 can be improved.

In addition, the number of the solar cell modules 5, which are disposed adjacent to each other, may be decreased due to restrictions such as the location of installation or the like. In this case, a gap corresponding to the main attachment sections 43 of the solar cell modules 5 decreased in the panel thickness direction T occurs. When the gap occurs in the panel thickness direction T, a variation in unevenness may occur, and structural strength may be decreased.

Here, in the embodiment, the solar panel support unit 2 includes at least one of the first spacer 71A, the second spacer 71B, the third spacer 71C and the fourth spacer 71D. Accordingly, when the number of solar cell modules 5 disposed adjacent to each other is decreased, the gap in the panel thickness direction T can be filled by inserting any one or more of the spacers 71A, 71B, 71C and 71D into a gap generated in the panel thickness direction T. Accordingly, equalization of unevenness can be achieved, and improvement of structural strength or appearance can be achieved.

Further, in the embodiment, the first spacer 71A, the second spacer 71B, the third spacer 71C and the fourth spacer 71D include the identifications 211, 212, 213 and 214 having at least one of substantially the same number, color, pattern, and so on, as the identifications 201, 202, 203 and 204 of the main attachment sections 43 of the first to fourth members 31, 32, 33 and 32 corresponding thereto. For this reason, when insertion of the spacers is forgotten, a place with no spacer can be easily seen. Accordingly, easiness of inspecting whether the spacers are inserted can be improved, and cases in which insertion of the spacers is forgotten can be reduced.

For example, when the identifications 201, 202, 203 and 204 are provided on the side surfaces 43c of the main attachment section 43 and the identifications 211, 212, 213 and 214 are provided on the side surfaces 71c of the spacers 71A, 71B, 71C and 71D, even in a state that the plurality of main attachment sections 43 overlap each other, the identification is easily checked. Accordingly, cases in which insertion of the spacers is forgotten can be reduced to a greater extent.

Further, for example, when only two kinds of main attachment sections 43 provided at different levels (for example, in the first embodiment, the main attachment section 43 of the first member 31 and the main attachment section 43 of the second member 32) are installed, the first identification 201 and the second identification 202 may also be installed at only the two kinds of main attachment sections 43. In addition, the identifications 201, 202, 203 and 204 may also be formed at another portion of the frame 17, instead of the main attachment section 43 or in addition to the main attachment section 43. For example, the identifications 201, 202, 203 and 204 are formed at different positions when seen from a center of the solar cell module 5 (for example, a center of the solar panel 16).

FIFTH EMBODIMENT

Next, a fifth embodiment will be described with reference to FIGS. 14 and 15. The embodiment is different from the third embodiment in that some of the four solar cell modules 5 are disposed to overlap each other by the two kinds of support members. Note that, the other configurations of the embodiment are the same as the configurations of the third embodiment.

Figure 14:
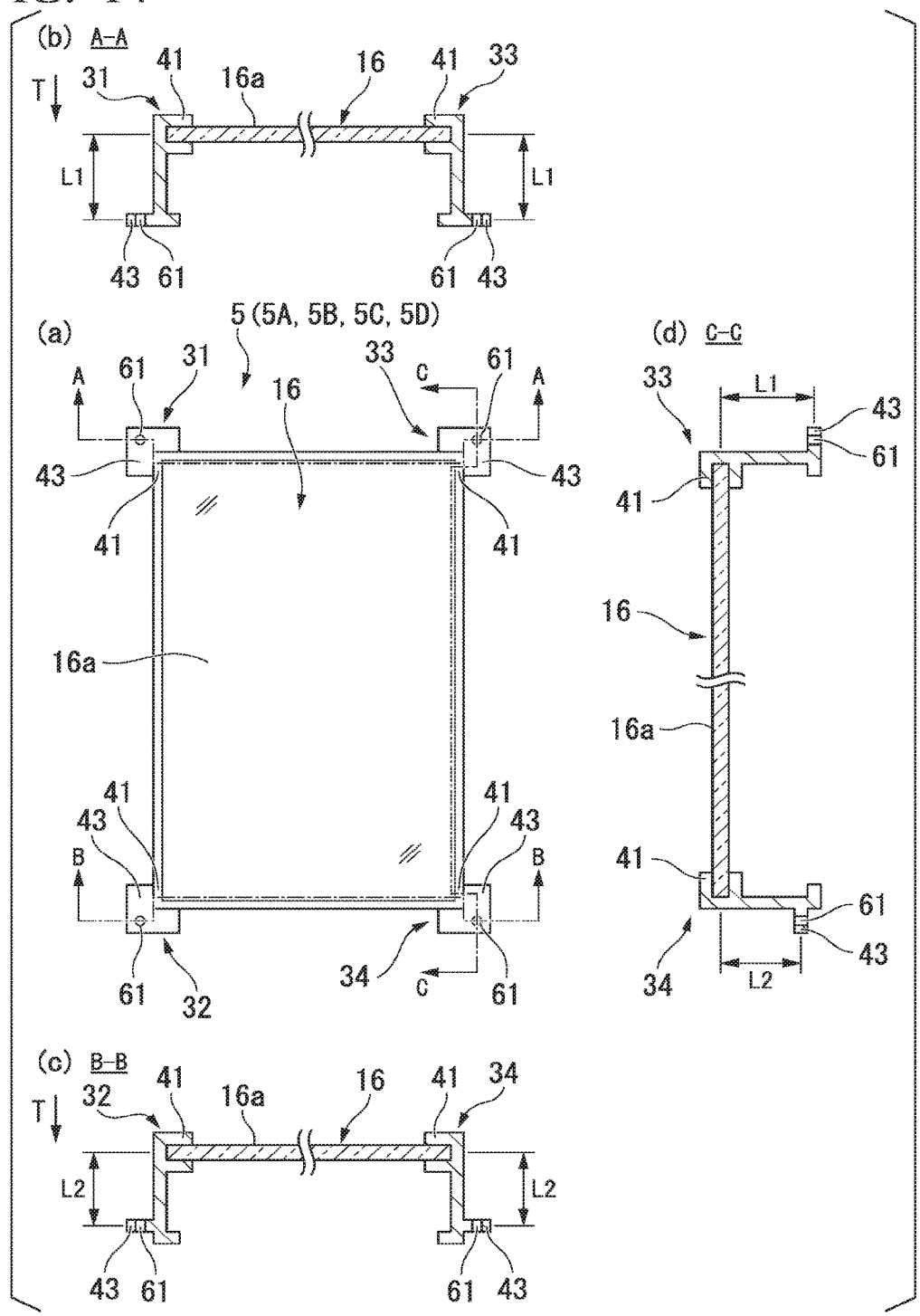
FIG. 14 is a view showing a solar cell module of a fifth embodiment.

FIG. 14 shows the solar cell modules 5 (for example, the first to fourth solar cell modules 5A, 5B, 5C and 5D) of the embodiment. Further, (a) in FIG. 14 is a plan view of the solar cell module 5. (b) in FIG. 14 is a cross-sectional view taken along line A-A of the solar cell module 5 shown in (a) in FIG. 14. (c) in FIG. 14 is a cross-sectional view taken along line B-B of the solar cell module 5 shown in (a) in FIG. 14. (d) in FIG. 14 is a cross-sectional view taken along line C-C of the solar cell module 5 shown in (a) in FIG. 14.

As shown in FIG. 14, the frame 17 of the solar cell module 5 of the embodiment includes a first member (a first section) 31, a second member (a second section) 32, a third member (a third section) 33 and a fourth member (a fourth section) 34.

In the embodiment, the main attachment section 43 of the first member 31 and the main attachment section 43 of the third member 33 are provided at the same level. For example, the main attachment section 43 of the first member 31 is disposed at a position spaced by the first distance L1 from the support section 41 of the first member 31 in the panel thickness direction T. The main attachment section 43 of the third member 33 is disposed at a position spaced by the first distance L1 from the support section 41 of the third member 33 in the panel thickness direction T. In the embodiment, the first member 31 and the third member 33 are members having substantially the same shape (for example, a line symmetrical shape).

In addition, the main attachment section 43 of the second member 32 and the main attachment section 43 of the fourth member 34 are provided at the same level. For example, the main attachment section 43 of the second member 32 is disposed at a position spaced by the second distance L2 from the support section 41 of the second member 32 in the panel thickness direction T. The main attachment section 43 of the fourth member 34 is disposed at a position spaced by the second distance L2 from the support section 41 of the fourth member 34 in the panel thickness direction T. In the embodiment, the second member 32 and the fourth member 34 are members having substantially the same shape (for example, a line symmetrical shape).

Next, an attachment structure of the plurality of solar cell modules 5 will be described.

Figure 15:
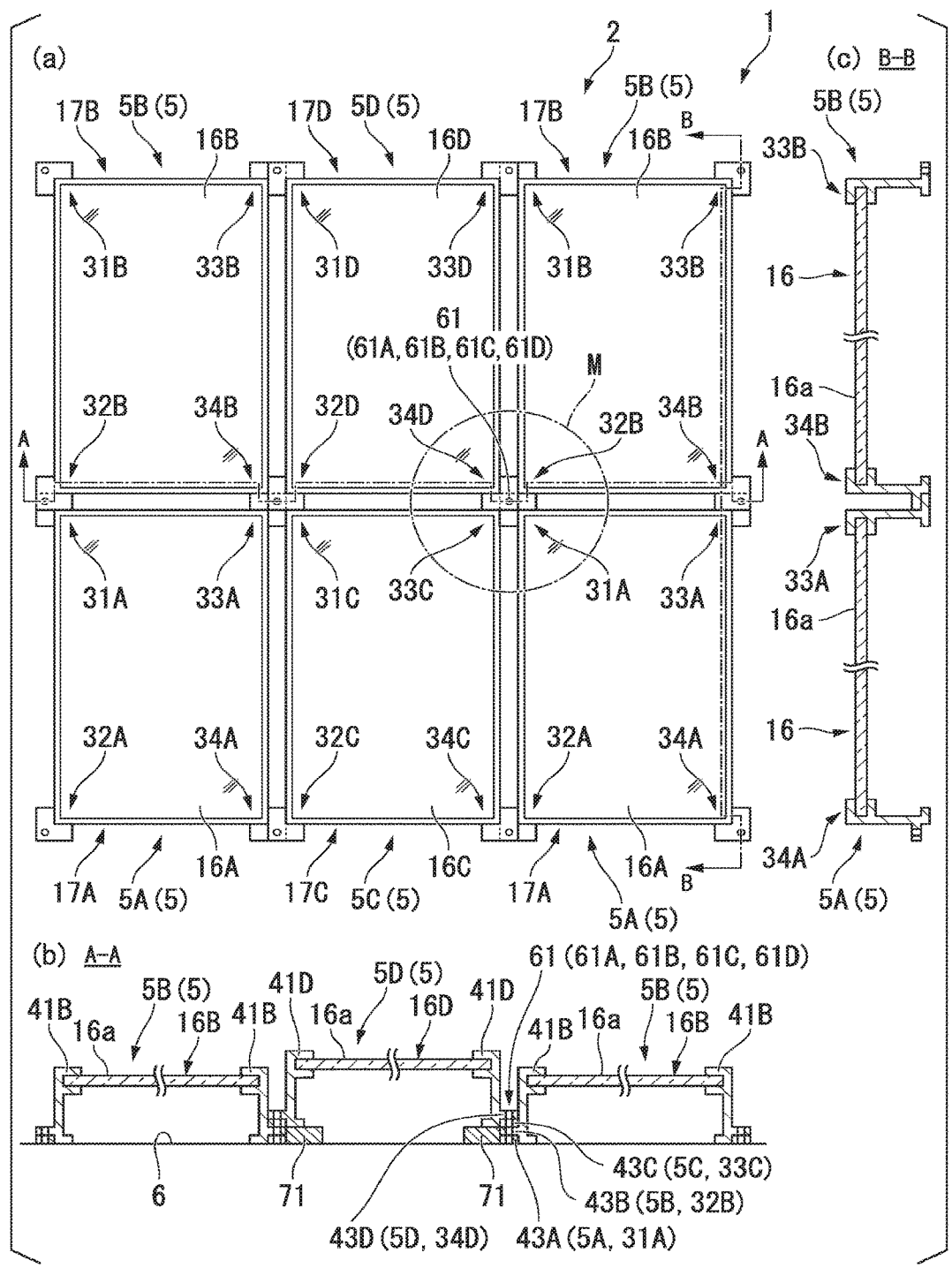
FIG. 15 is a view showing disposition of the solar cell modules of the fifth embodiment.

FIG. 15 shows disposition of the solar cell modules 5 of the embodiment.

Further, (a) in FIG. 15 is a plan view of the plurality of solar cell modules 5. (b) in FIG. 15 is a cross-sectional view taken along line A-A of the plurality of solar cell modules 5 shown in (a) in FIG. 15. (c) in FIG. 15 is a cross-sectional view taken along line B-B of the plurality of solar cell modules 5 shown in (a) in FIG. 15.

When a region shown by a dotted line M in FIG. 15 is seen, the main attachment section 43A of the first member 31A of the first solar cell module 5A is placed on the stand 6. The main attachment section 43B of the second member 32B of the second solar cell module 5B is placed on (overlaps) the main attachment section 43A of the first member 31A of the first solar cell module 5A from an opposite side of the stand 6. The main attachment section 43C of the third member 33C of the third solar cell module 5C is placed on (overlaps) the main attachment section 43B of the second member 32B of the second solar cell module 5B from an opposite side of the stand 6. The main attachment section 43D of the fourth member 34D of the fourth solar cell module 5D is placed on (overlaps) the main attachment section 43C of the third member 33C of the third solar cell module 5C from an opposite side of the stand 6.

Accordingly, the main attachment sections 43A, 43B, 43C and 43D of the four solar cell modules 5A, 5B, 5C and 5D overlap one another in the panel thickness direction T. In the embodiment, front surfaces (light receiving surfaces) 16a of the solar panels 16A and 16B of the first and second solar cell modules 5A and 5B are disposed to be substantially flush with each other. In addition, front surfaces (light receiving surfaces) 16a of the solar panels 16C and 16D of the third and fourth solar cell modules 5C and 5D are disposed to be substantially flush with each other. On the other hand, the front surfaces 16a of the solar panels 16C and 16D of the third and fourth solar cell modules 5C and 5D and the front surfaces 16a of the solar panels 16A and 16B of the first and second solar cell modules 5A and 5B are disposed at different levels.

As described above, in the embodiment, the solar cell modules 5 including the main attachment sections 43 having two different heights overlap one another in four stages. Then, the spacers 71 are inserted into gaps between the stand 6 (or the ground surface) and the solar cell modules 5. Accordingly, even in the solar cell modules 5 including the main attachment sections 43 having two different heights, the main attachment sections 43 of the four neighboring solar cell modules 5 can overlap in the panel thickness direction T to be jointly fastened by the fastening members 66. According to the above-mentioned configuration, in comparison with the case in which the solar cell modules 5 including the main attachment sections 43 having four different heights are prepared, reduction in manufacturing cost of the solar power generation system 1 can be achieved.

(Variant)

Figure 16:
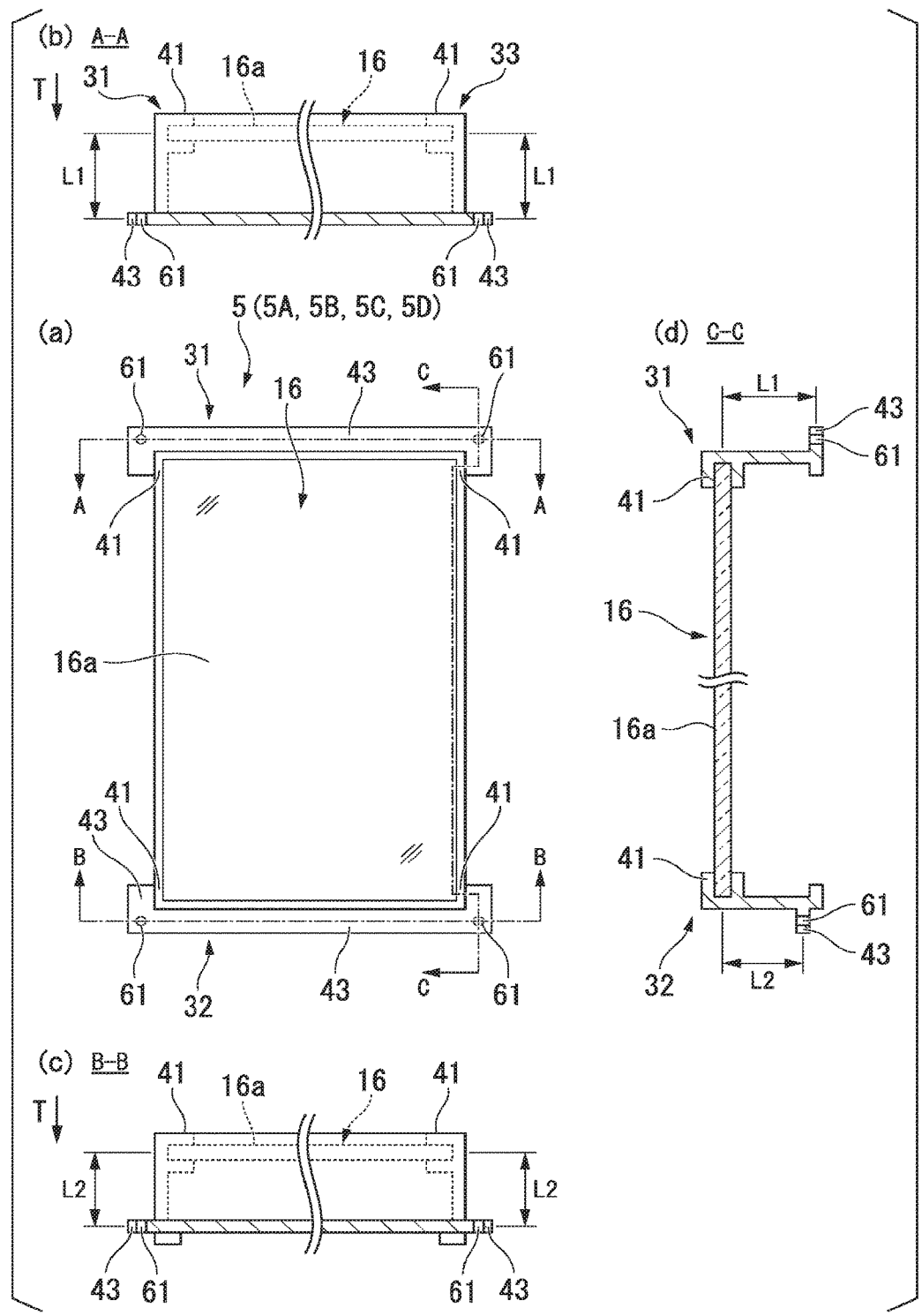
FIG. 16 is a view showing a solar cell module of a variant of the fifth embodiment.

As shown in FIG. 16, the first member 31 and the third member 33 described in the fifth embodiment may be integrally formed as one first member 31. Similarly, the second member 32 and the fourth member 34 described in the fifth embodiment may be integrally formed as one second member 32. Even in the above-mentioned configuration, like the fifth embodiment, the solar cell modules 5 including the main attachment sections 43 having two different heights can overlap in four stages. Accordingly, reduction in manufacturing cost of the solar power generation system 1 can be achieved.

SIXTH EMBODIMENT

Next, a sixth embodiment will be described with reference to FIGS. 17 and 18. The embodiment is different from the fifth embodiment in that the solar panel 16 is supported at an angle inclined with respect to a horizontal direction. Note that, the other configurations of the embodiment are the same as the configurations of the fifth embodiment.

Figure 17:
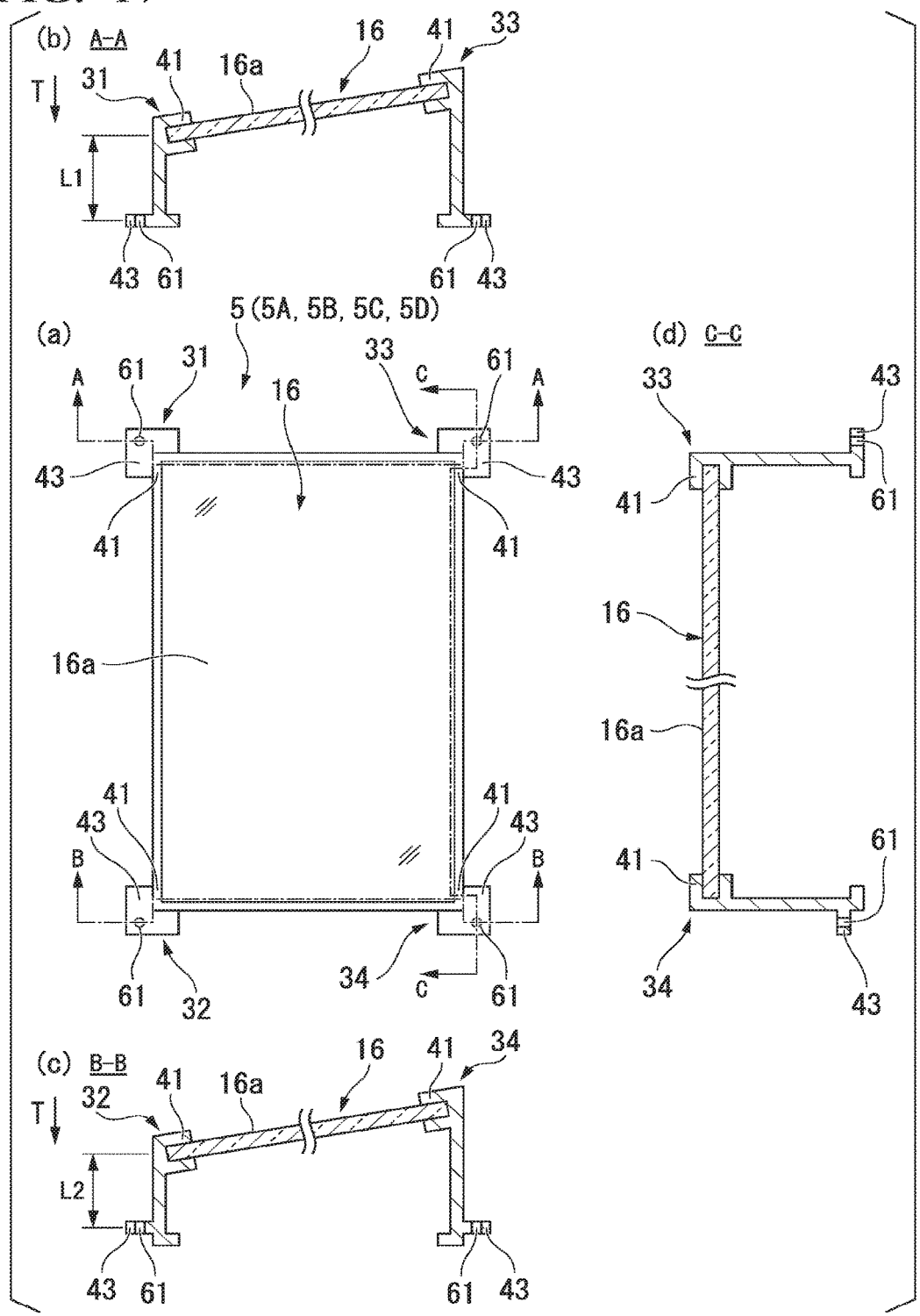
FIG. 17 is a view showing a solar cell module of a sixth embodiment.

FIG. 17 shows a solar cell module 5 (for example, the first to fourth solar cell modules 5A, 5B, 5C and 5D) of the embodiment. Further, (a) in FIG. 17 is a plan view of the solar cell module 5. (b) in FIG. 17 is a cross-sectional view taken along line A-A of the solar cell module 5 shown in (a) in FIG. 17. (c) in FIG. 17 is a cross-sectional view taken along line B-B of the solar cell module 5 shown in (a) in FIG. 17. (d) in FIG. 17 is a cross-sectional view taken along line C-C of the solar cell module 5 shown in (a) in FIG. 17. As shown in FIG. 17, the frame 17 of the solar cell module 5 supports the solar panel 16 in a posture in which the solar panel 16 is inclined with respect to the horizontal direction. In other words, the frame 17 of the solar cell module 5 supports the solar panel 16 in an inclined posture with respect to an installation surface (for example, the stand 6), to which the solar cell module 5 is attached.

Figure 18:
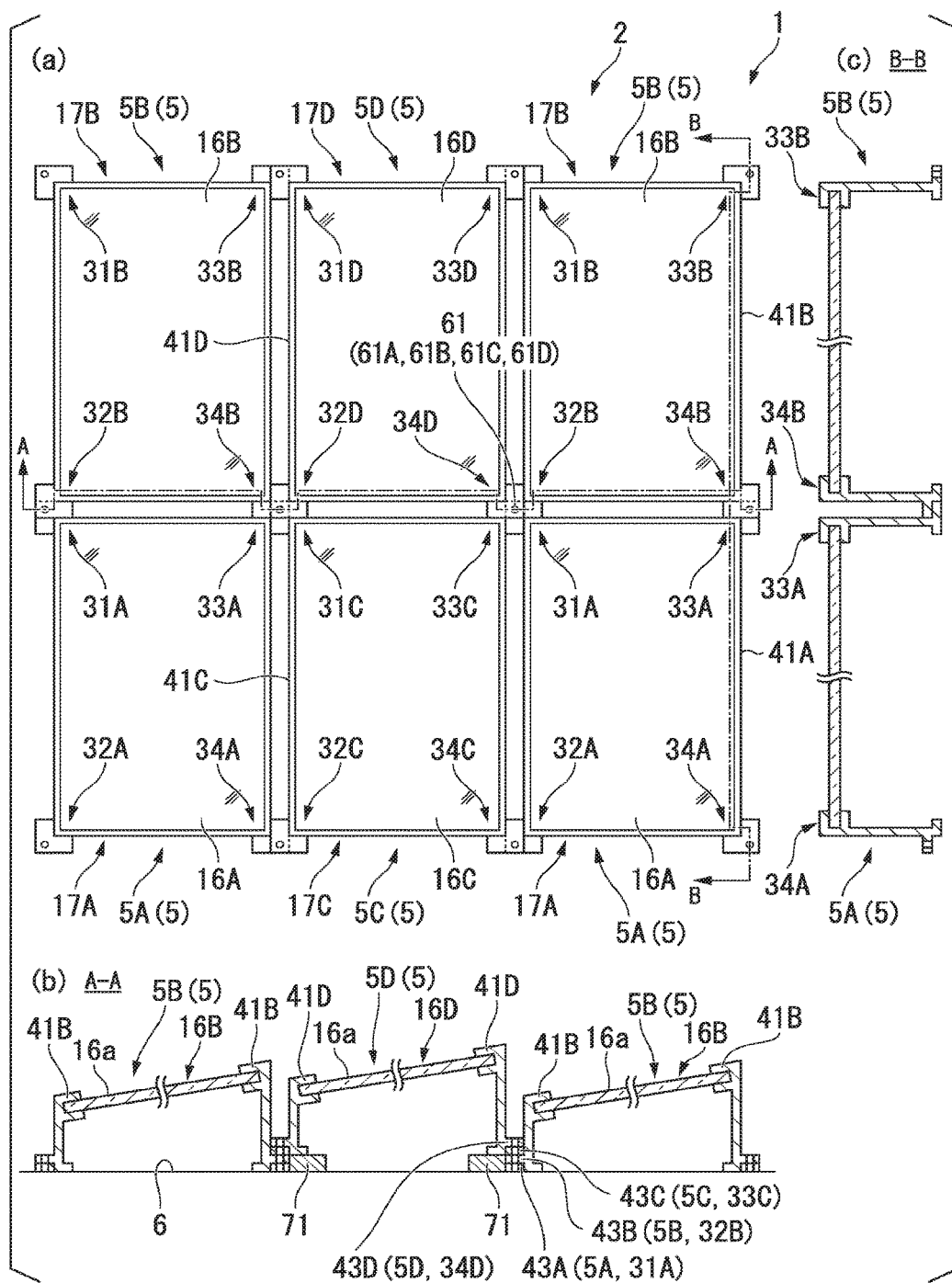
FIG. 18 is a view showing disposition of the solar cell modules of the sixth embodiment.

FIG. 18 shows disposition of the solar cell modules 5 of the embodiment. Further, (a) in FIG. 18 is a plan view of the plurality of solar cell modules 5. (b) in FIG. 18 is a cross-sectional view taken along line A-A of the plurality of solar cell modules 5 shown in (a) in FIG. 18. (c) in FIG. 18 is a cross-sectional view taken along line B-B of the plurality of solar cell modules 5 of (a) in FIG. 18.

As shown in FIG. 18, the frame 17A of the first solar cell module 5A (for example, the support section 41A of the first member 31A) supports the first solar panel 16A in an inclined posture with respect to the horizontal direction. The frame 17B of the second solar cell module 5B (for example, the support section 41B of the second member 32B) supports the second solar panel 16B in an inclined posture with respect to the horizontal direction. The frame 17C of the third solar cell module 5C (for example, the support section 41C of the third member 33C) supports the third solar panel 16C in an inclined posture with respect to the horizontal direction. The frame 17D of the fourth solar cell module 5D (for example, the support section 41D of the fourth member 34) supports the fourth solar panel 16D in an inclined posture with respect to the horizontal direction. The first to fourth solar panels 16A, 16B, 16C and 16D are inclined in substantially the same direction.

As described above, in the embodiment, the solar panel 16 of each of the solar cell modules 5 has an array angle. Accordingly, current collecting efficiency of the solar power generation system 1 can be increased.

SEVENTH EMBODIMENT

Next, a seventh embodiment will be described with reference to FIGS. 19 to 21. The embodiment is different from the third embodiment in that one of the upper surfaces 43a and the lower surfaces 43b of the main attachment sections 43 of the first to fourth members 31, 32, 33 and 34 has inclined portions. Note that, the other configuration of the embodiment is the same as the configuration of the third embodiment. In addition, in FIGS. 19 to 21, some of the configurations of the solar cell modules 5 are schematically shown.

Figure 19:
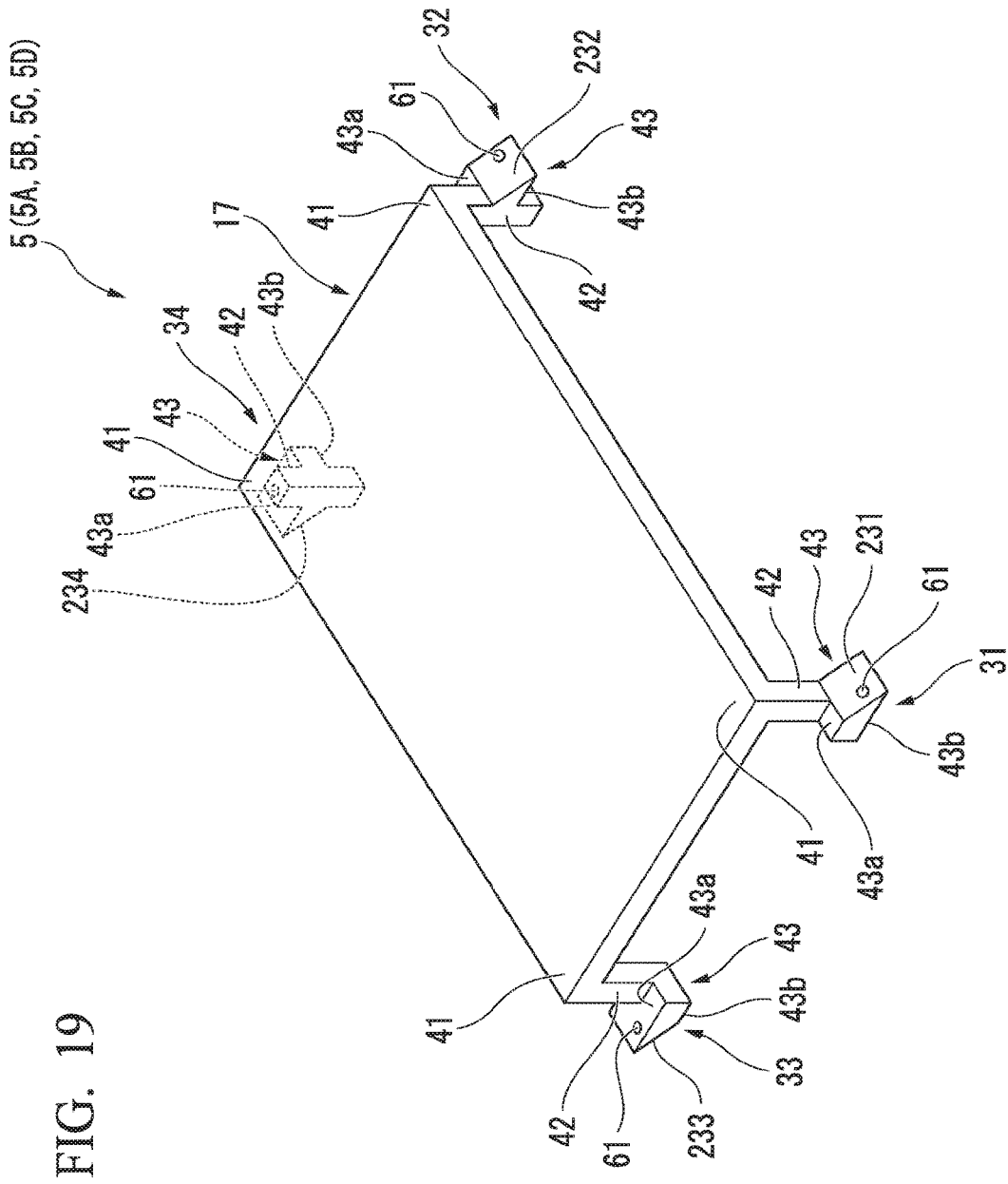
FIG. 19 is a perspective view showing a solar cell module of a seventh embodiment.

FIG. 19 shows a solar cell module 5 (for example, the first to fourth solar cell modules 5A, 5B, 5C and 5D) of the embodiment. As shown in FIG. 19, the frame 17 of the solar cell module 5 includes a first member (a first section) 31, a second member (a second section) 32, a third member (a third section) 33 and a fourth member (a fourth section) 34.

In the embodiment, the main attachment section 43 of the first member 31 and the main attachment section 43 of the third member 33 are provided at substantially the same level. Note that, the fact that the main attachment section 43 of the first member 31 and the main attachment section 43 of the third member 33 are positioned at substantially the same level means that, for example, a part of the upper surface 43a of the main attachment section 43 of the first member 31 and a part of the upper surface 43a of the main attachment section 43 of the third member 33 are disposed at substantially the same level, or a part of the lower surface 43b of the main attachment section 43 of the first member 31 and a part of the lower surface 43b of the main attachment section 43 of the third member 33 are disposed at substantially the same level. The main attachment section 43 of the first member 31 is disposed at a position spaced by the first distance L1 from the support section 41 of the first member 31 in the panel thickness direction T. Similarly, the main attachment section 43 of the third member 33 is disposed at a position spaced by the first distance L1 from the support section 41 of the third member 33 in the panel thickness direction T.

In addition, in the embodiment, the main attachment section 43 of the second member 32 and the main attachment section 43 of the fourth member 34 are provided at substantially the same level. The fact that the main attachment section 43 of the second member 32 and the main attachment section 43 of the fourth member 34 are disposed at substantially the same level means that, for example, a part of the upper surface 43a of the main attachment section 43 of the second member 32 and a part of the upper surface 43a of the main attachment section 43 of the fourth member 34 are disposed at substantially the same level, or a part of the lower surface 43b of the main attachment section 43 of the second member 32 and a part of the lower surface 43b of the main attachment section 43 of the fourth member 34 are disposed at substantially the same level. The main attachment section 43 of the second member 32 is disposed at a position spaced by the second distance L2 from the support section 41 of the second member 32 in the panel thickness direction T. Similarly, the main attachment section 43 of the fourth member 34 is disposed at a position spaced by the second distance L2 from the support section 41 of the fourth member 34 in the panel thickness direction T.

Here, in the embodiment, the upper surface 43a of the main attachment section 43 of the first member 31 has a first inclined portion 231. The first inclined portion 231 is inclined with respect to a front surface (a light receiving surface) 16a of the solar panel 16. The first inclined portion 231 is inclined such that, for example, a portion of the upper surface 43a of the main attachment section 43 gradually falls as it approaches the next solar cell module 5. The first inclined portion 231 has the hole 61 through which the fastening member 66 is inserted.

The upper surface 43a of the main attachment section 43 of the second member 32 has a second inclined portion 232. The second inclined portion 232 is inclined with respect to the front surface 16a of the solar panel 16. The second inclined portion 232 is inclined such that, for example, a portion of the upper surface 43a of the main attachment section 43 gradually rises as it approaches the next solar cell module 5. The second inclined portion 232 has the hole 61 through which the fastening member 66 is inserted.

The lower surface 43b of the main attachment section 43 of the third member 33 has a third inclined portion 233. The third inclined portion 233 is inclined with respect to the front surface 16a of the solar panel 16. The third inclined portion 233 is inclined in substantially the same direction as the first inclined portion 231 and overlaps the first inclined portion 231 of the next solar cell module 5. The third inclined portion 233 has the hole 61 through which the fastening member 66 is inserted.

The lower surface 43b of the main attachment section 43 of the fourth member 34 has a fourth inclined portion 234. The fourth inclined portion 234 is inclined with respect to the front surface 16a of the solar panel 16. The fourth inclined portion 234 is inclined in substantially the same direction as the second inclined portion 232 and overlaps the second inclined portion 232 of the next solar cell module 5. The fourth inclined portion 234 has the hole 61 through which the fastening member 66 is inserted.

Next, an attachment structure of the plurality of solar cell modules 5 will be described.

Figure 20:
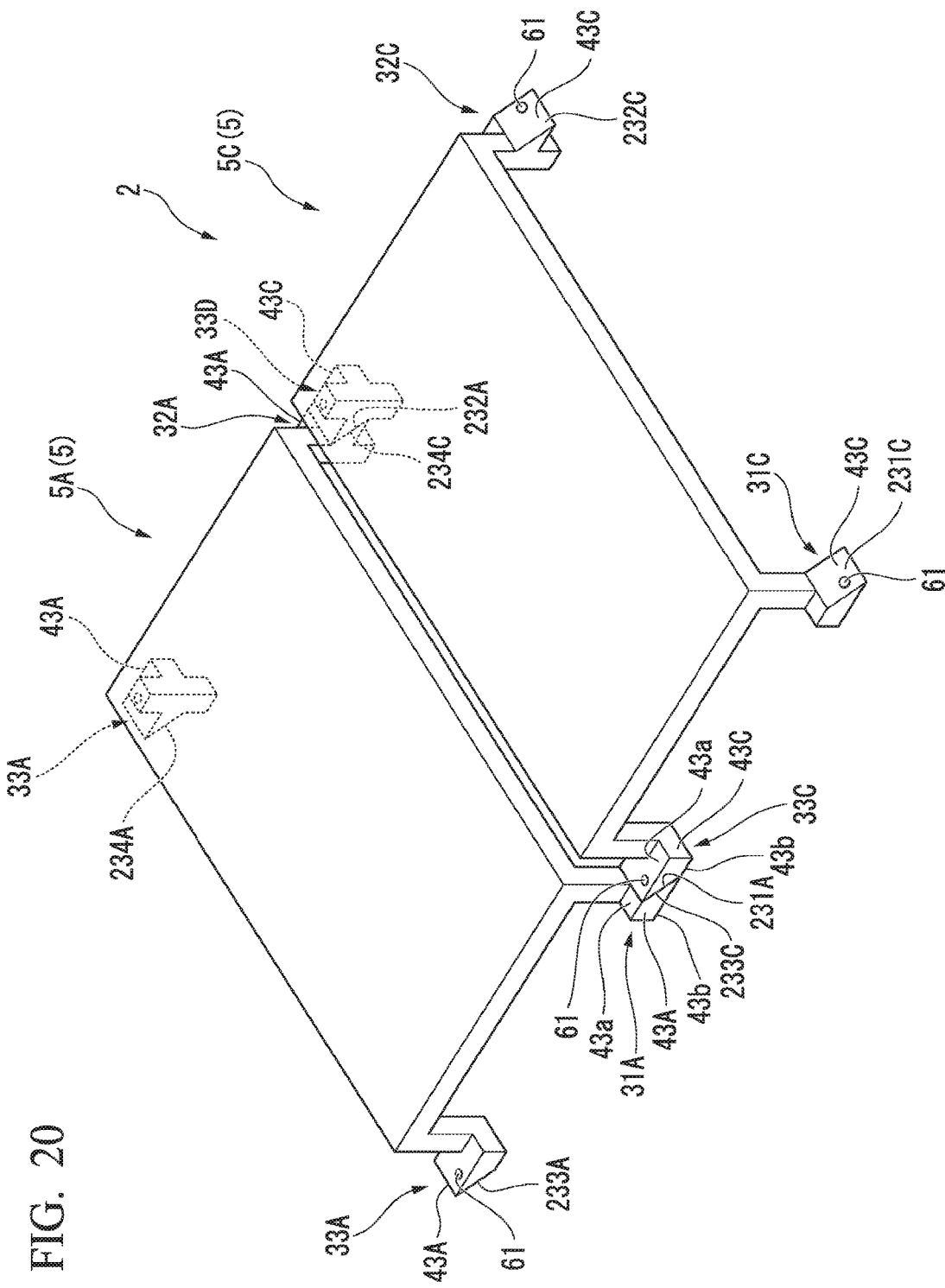
FIG. 20 is a perspective view showing disposition of first and third solar cell modules of the seventh embodiment.

FIG. 20 shows disposition of the first and third solar cell modules 5A and 5C of the embodiment. As shown in FIG. 20, a third inclined portion 233C of the main attachment section 43C of the third member 33C of the third solar cell module 5C overlaps a first inclined portion 231A of the main attachment section 43A of the first member 31A of the first solar cell module 5A. Accordingly, the main attachment section 43A of the first member 31A of the first solar cell module 5A and the main attachment section 43C of the third member 33C of the third solar cell module 5C overlap at least partially each other in a state that they are disposed at substantially the same level.

Figure 21:
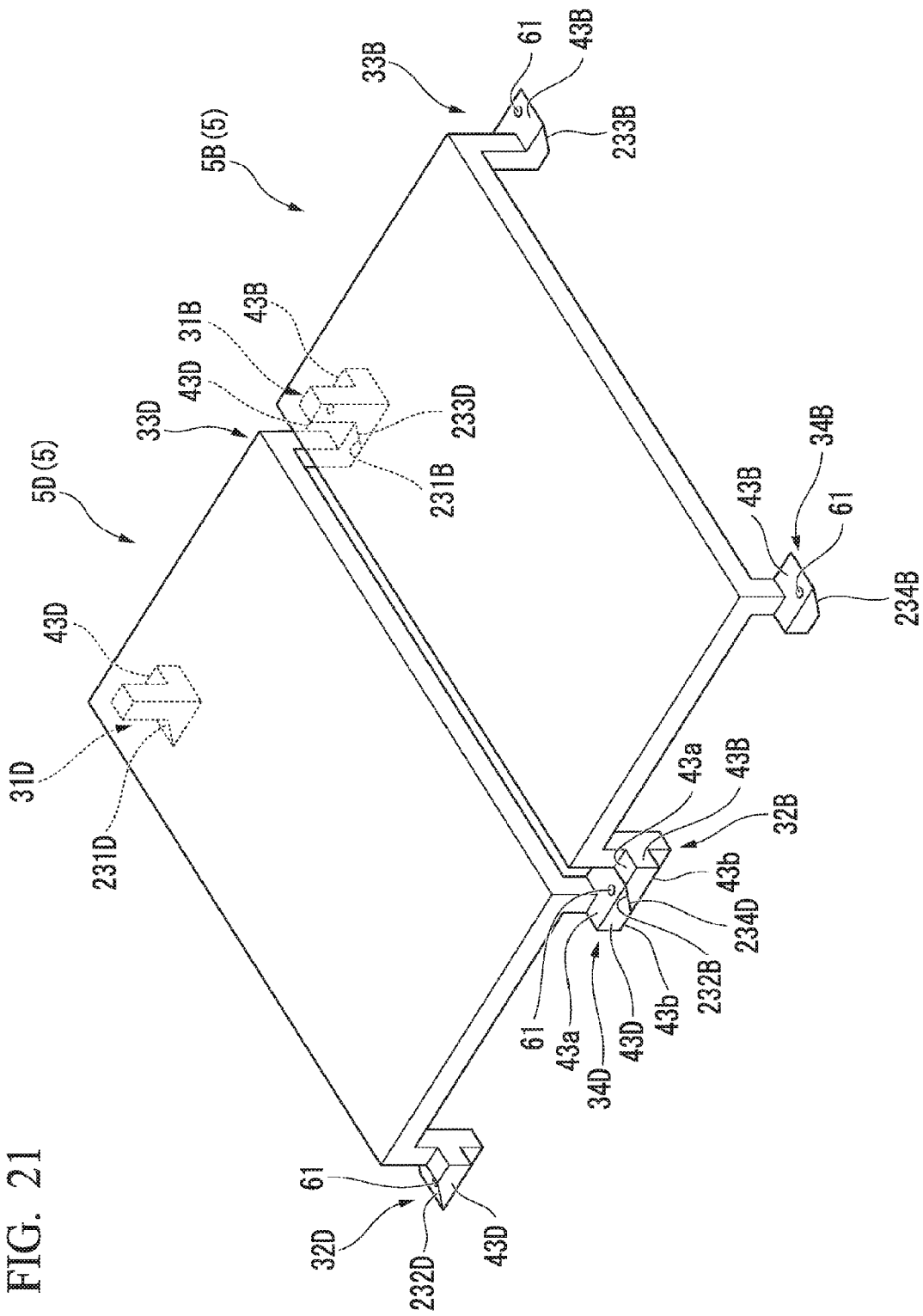
FIG. 21 is a perspective view showing disposition of second and fourth solar cell modules of the seventh embodiment.

FIG. 21 shows disposition of the second and fourth solar cell modules 5B and 5D of the embodiment. As shown in FIG. 21, a fourth inclined portion 234D of the main attachment section 43D of the fourth member 34D of the fourth solar cell module 5D overlaps a second inclined portion 232B of the main attachment section 43B of the second member 32B of the second solar cell module 5B. Accordingly, the main attachment section 43B of the second member 32B of the second solar cell module 5B and the main attachment section 43D of the fourth member 34D of the fourth solar cell module 5D may overlap each other at least partially in a state that they are disposed at substantially the same level.

The main attachment sections 43B and 43D of the second solar cell module 5B and the fourth solar cell module 5D (a set of the two solar cell modules 5 shown in FIG. 21) which overlap in this way overlap the main attachment sections 43A and 43C of the first solar cell module 5A and the third solar cell module 5C (a set of the two solar cell modules 5 shown in FIG. 20), which overlap similarly, from above. Accordingly, the main attachment sections 43A, 43B, 43C and 43D of the four solar cell modules 5A, 5B, 5C and 5D overlap one another in the panel thickness direction T in a state that the front surfaces 16a of the solar panels 16A, 16B, 16C and 16D of the four solar cell modules 5A, 5B, 5C and 5D are substantially flush with each other. The holes 61A, 61B, 61C and 61D formed in the inclined portions 231, 232, 233 and 234 are in communication with one another and the fastening member 66 passes therethrough.

As described above, in the embodiment, the main attachment sections 43 of the first to fourth members 31, 32, 33 and 34 have different shapes because the inclined portions 231, 232, 233 and 234 are formed, and thus can be discriminated based on appearance. For this reason, a worker who installs the solar cell modules 5 can easily check orientations of the solar cell modules 5 during installation by viewing at least one of the first to fourth inclined portions 231, 232, 233 and 234. Accordingly, the plurality of solar cell modules 5 can be easily arranged in a consistent direction. Accordingly, assemblability of the plurality of solar cell modules 5 can be improved. In addition, according to the configuration of the embodiment, for example, since the main attachment section 43 of the first member 31 and the main attachment section 43 of the third member 33 are disposed at substantially the same level, reduction in thickness of the solar power generation system 1 can also be achieved. In addition, in the embodiment, reduction in the number of fastening members 66 such as bolts or the like and attachment processes can be achieved. Accordingly, reduction in material cost and construction cost of the fastening members 66 can be anticipated.

Further, at least one of the first inclined portion 231 and the second inclined portion 232 may be installed at the lower surface 43b of the main attachment section 43 instead of the upper surface 43a of the main attachment section 43. Similarly, at least one of the third inclined portion 233 and the fourth inclined portion 234 may also be formed at the upper surface 43a of the main attachment section 43 instead of the lower surface 43b of the main attachment section 43.

In addition, in the embodiment, as the spacers 71 corresponding to the shapes of the inclined portions 231, 232, 233 and 234 are provided, generation of gaps in the panel thickness direction T due to restrictions on the location of installation or the like can be suppressed.

EIGHTH EMBODIMENT

Next, an eighth embodiment will be described with reference to FIGS. 22 and 23. The embodiment is different from the first embodiment in that a groove 91 is formed in the frame 17 and at least one of the main attachment sections 43 is slidably movable along the groove 91. Note that, the other configurations of the embodiment are the same as the configurations of the first embodiment.

Figure 22:
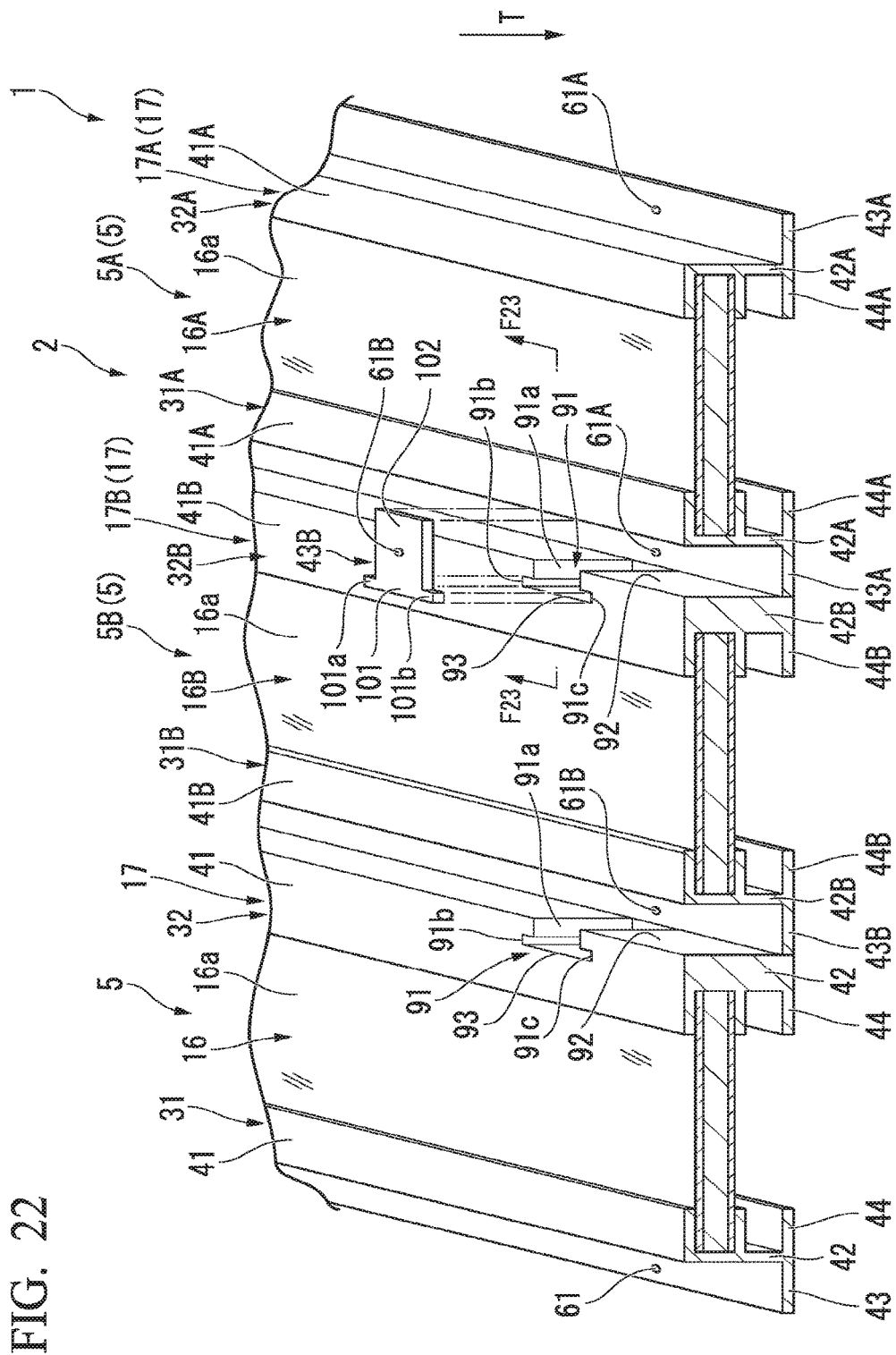
FIG. 22 is a perspective view showing solar cell modules of an eighth embodiment.

As shown in FIG. 22, the second member 32B of the second solar cell module 5B has the groove (a cutout groove, a guide groove) 91. More specifically, the second member 32B of the second solar cell module 5B has a side surface 92 facing the first solar cell module 5A. The groove 91 is formed in the side surface 92 of the second member 32B and recessed from the side surface 92 of the second member 32B toward the inside of the second solar cell module 5B. The groove 91 is formed in the panel thickness direction T. The groove 91 is formed throughout the support section 41B and the erection section 42B. The groove 91 has an opening 93 opened toward the outside in the panel thickness direction T.

The groove 91 has a central section 91a, a first recess section 91b and a second recess section 91c. The first recess section 91b and the second recess section 91c are formed at positions spaced apart from the side surface 92 of the second member 32B. The first recess section 91b is recessed from the central section 91a in the longitudinal direction of the second member 32B. The second recess section 91c is recessed from the central section 91a in a direction opposite to the first recess section 91b in the longitudinal direction of the second member 32B. Each of the central section 91a, the first recess section 91b and the second recess section 91c has a constant shape and extends in the panel thickness direction T.

In the embodiment, the main attachment section 43B of the second member 32B serving as a fixing hole seat is formed separately from the support section 41B and the erection section 42B of the second member 32B. The main attachment section 43B of the second member 32B is a slide body inserted into the groove 91 from the opening 93 and slidable along the groove 91. More specifically, the main attachment section 43B includes an insertion section 101 inserted into the groove 91 and a projection section 102 protruding toward the outside of the groove 91. The insertion section 101 has an appearance corresponding to the shape of the groove 91. For example, the insertion section 101 includes a first protrusion 101a inserted into the first recess section 91b of the groove 91 and a second protrusion 101b inserted into the second recess section 91c of the groove 91. As the first protrusion 101a and the second protrusion 101b are inserted into the first recess section 91b and the second recess section 91c, the main attachment section 43B of the second member 32B is not removed laterally from the groove 91.

Figure 23:
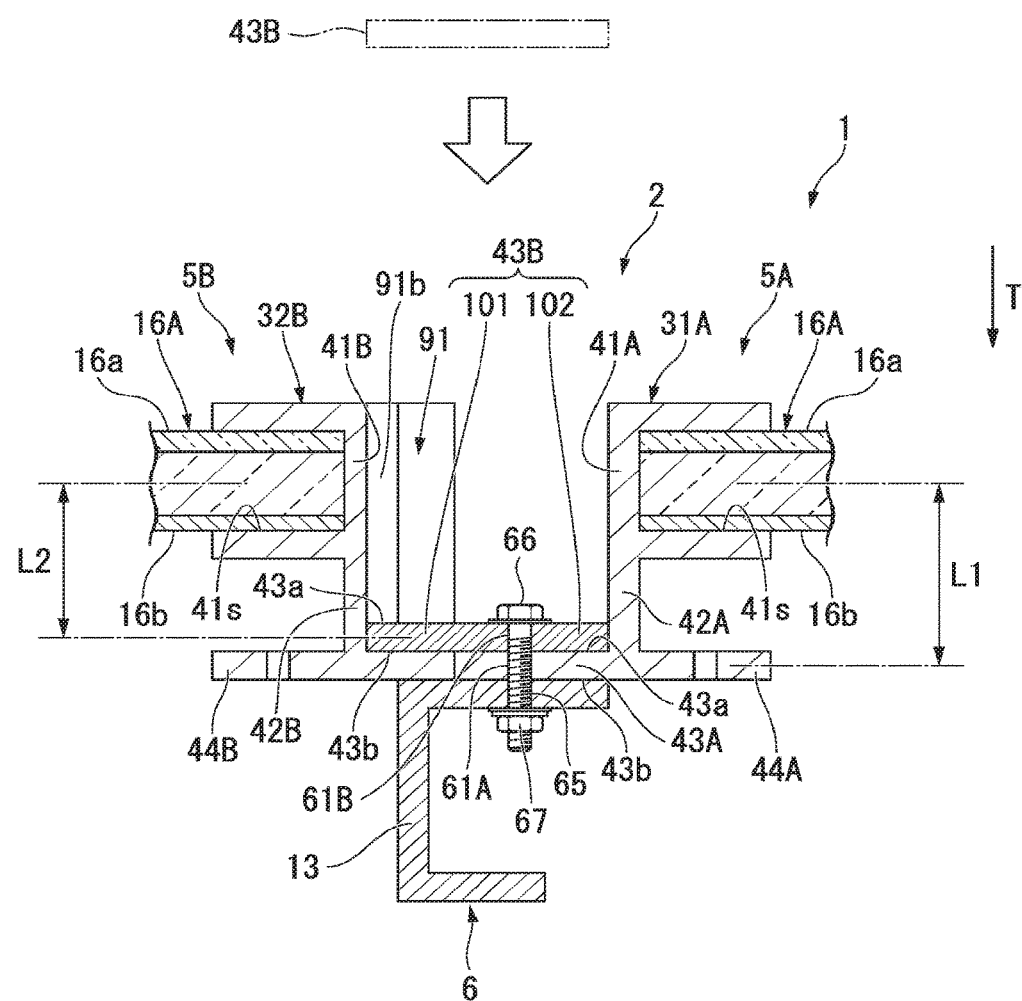
FIG. 23 is a cross-sectional view taken along line F23-F23 of the solar cell modules shown in FIG. 22.

FIG. 23 is a cross-sectional view taken along line F23-F23 of the solar panel support unit 2 shown in FIG. 22.

As shown in FIG. 23, the main attachment section 43B of the second member 32B of the second solar cell module 5B is inserted into the groove 91 from the opening 93 of the second solar cell module 5B after the first solar cell module 5A and the second solar cell module 5B, rather than the main attachment section 43B, are placed on the stand 6. Accordingly, the main attachment section 43B overlaps the main attachment section 43A of the first member 31A of the first solar cell module 5A from an opposite side of the stand 6. The fastening member 66 passes through the holes 61A and 61B of the main attachment sections 43A and 43B of the first member 31A and the second member 32B. Accordingly, the main attachment sections 43A and 43B of the first member 31A of the first solar cell module 5A and the second member 32B of the second solar cell module 5B are jointly fastened to the stand 6 by the fastening member 66.

According to the above-mentioned configuration, like the first embodiment, reduction in the number of fixing parts can be achieved.

In addition, in the embodiment, the second member 32B (a second support member) of the second solar cell module 5B has the groove 91 formed in the panel thickness direction T. The main attachment section 43B (a second attachment section) of the second member 32B is formed separately from the support section 41B of the second member 32B, and at least a portion thereof is inserted into the groove 91 and slidable along the groove 91.

According to the above-mentioned configuration, even when a relatively large manufacturing error (dimensional tolerance) in a thickness of the main attachment section 43A of the first member 31A of the first solar cell module 5A occurs, the main attachment section 43B of the second member 32B of the second solar cell module 5B can overlap the main attachment section 43A of the first member 31A of the first solar cell module 5A with no gap. Accordingly, assemblability of the solar power generation system 1 can be further improved.

In the embodiment, the groove 91 is opened to the outside of the second member 32B in the panel thickness direction T. According to the above-mentioned configuration, the main attachment section 43B can be inserted into the groove 91 from the panel thickness direction T. Accordingly, assemblability of the solar power generation system 1 can be further improved.

(Variant)

Figure 24:
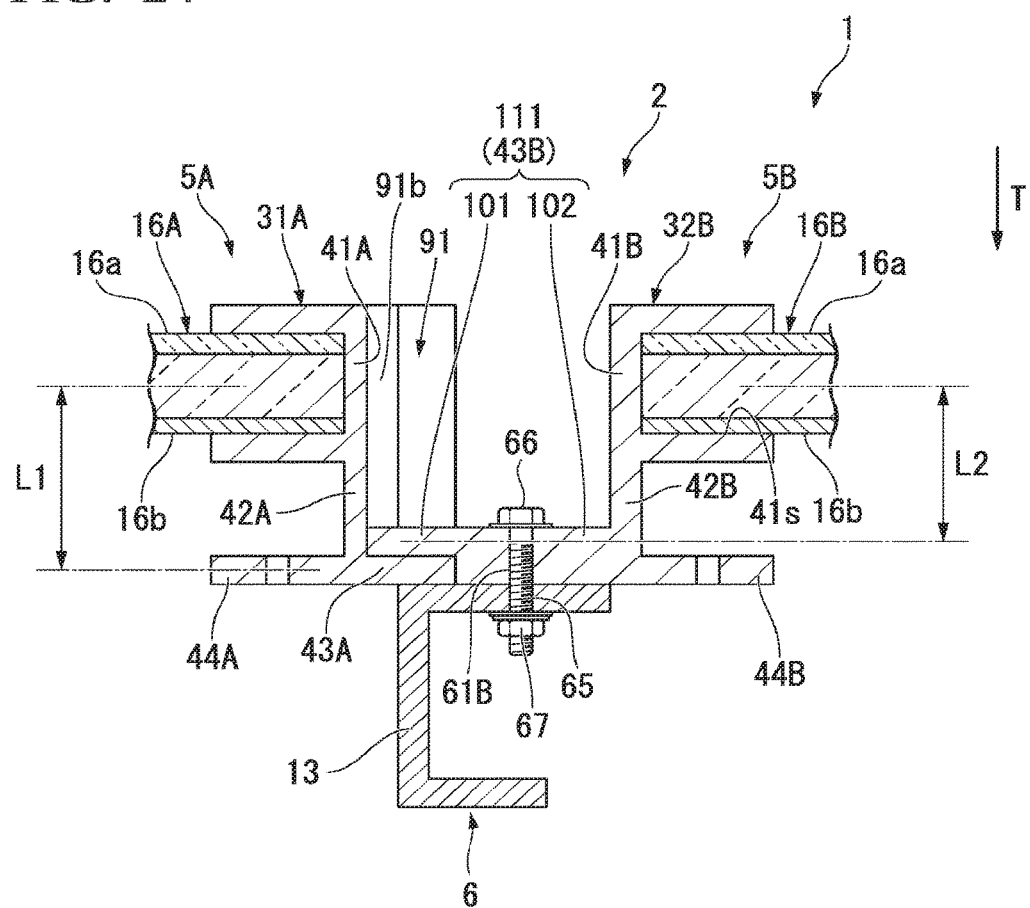
FIG. 24 is a cross-sectional view showing a variant of the solar cell modules of the eighth embodiment.

FIG. 24 shows one variant of the eighth embodiment.

In the eighth embodiment, the variant shown in FIG. 24 is a structure in which the main attachment section 43B of the second member 32B of the second solar cell module 5B is integrally formed with the first member 31A of the first solar cell module 5A.

Further, in the following description of the variant, for the convenience of description, an example in which the groove 91 is formed in the first solar cell module 5A and the main attachment section 43 inserted into the groove 91 is integrally formed with the second solar cell module 5B (i.e., an example in which the configuration of the first solar cell module 5A and the second solar cell module 5B are inverted with respect to the eighth embodiment) will be described.

In the variant, the first member 31A of the first solar cell module 5A has the groove 91. Further, in the variant, the main attachment section 43A of the first member 31A of the first solar cell module 5A may not have the hole 61A.

On the other hand, the second member 32B of the second solar cell module 5B has a suppressing section 111 inserted into the groove 91 of the first member 31A of the first solar cell module 5A. The suppressing section 111 functions as an example of the main attachment section 43B. The suppressing section 111 is integrally formed with the support section 41B and the erection section 42B of the second member 32B of the second solar cell module 5B. The suppressing section 111 has substantially the same configuration as the main attachment section 43B of the eighth embodiment. For example, the suppressing section 111 includes the first protrusion 101a and the second protrusion 101b. At least a part of the suppressing section 111 is inserted into the groove 91 from the opening 93 to be slidably movable along the groove 91. The suppressing section 111 faces the main attachment section 43A of the first member 31A of the first solar cell module 5A in the panel thickness direction T. The suppressing section 111 overlaps the main attachment section 43A of the first member 31A of the first solar cell module 5A and presses the main attachment section 43A toward the stand 6.

According to the above-mentioned configuration, like the first embodiment, reduction in the number of fixing parts can be achieved. That is, in the variant, the solar panel support unit 2 includes the first member 31A (a first support member) of the first solar cell module 5A and the second member 32B (a second support member) of the second solar cell module 5B. The first member 31A of the first solar cell module 5A has the support section 41A (a first support section) and the groove 91. The support section 41A is configured to support the solar panel 16A (a first solar panel). The groove 91 is formed in the panel thickness direction T. The second member 32B of the second solar cell module 5B includes the support section 41B (a second support section) and the suppressing section 11. The support section 41B is configured to support the solar panel 16B (a second solar panel). The suppressing section 111 is at least partially inserted into the groove 91 to face the first member 31A in the panel thickness direction T. According to the above-mentioned configuration, the first solar cell module 5A can be pressed by the suppressing section 111 of the second solar cell module 5B. Accordingly, reduction in the number of fixing parts configured to fix the solar cell modules 5 and reduction in the number of attachment processes of the fixing parts can be achieved.

NINTH EMBODIMENT

Next, a ninth embodiment will be described with reference to FIG. 25.

The embodiment is different from the eighth embodiment in that the main attachment section 43B serving as a slide body has a function of filling at least a part of the gap between the first solar cell module 5A and the second solar cell module 5B. Note that, the other configurations of the embodiment are the same as the configurations of the eighth embodiment.

Figure 25:
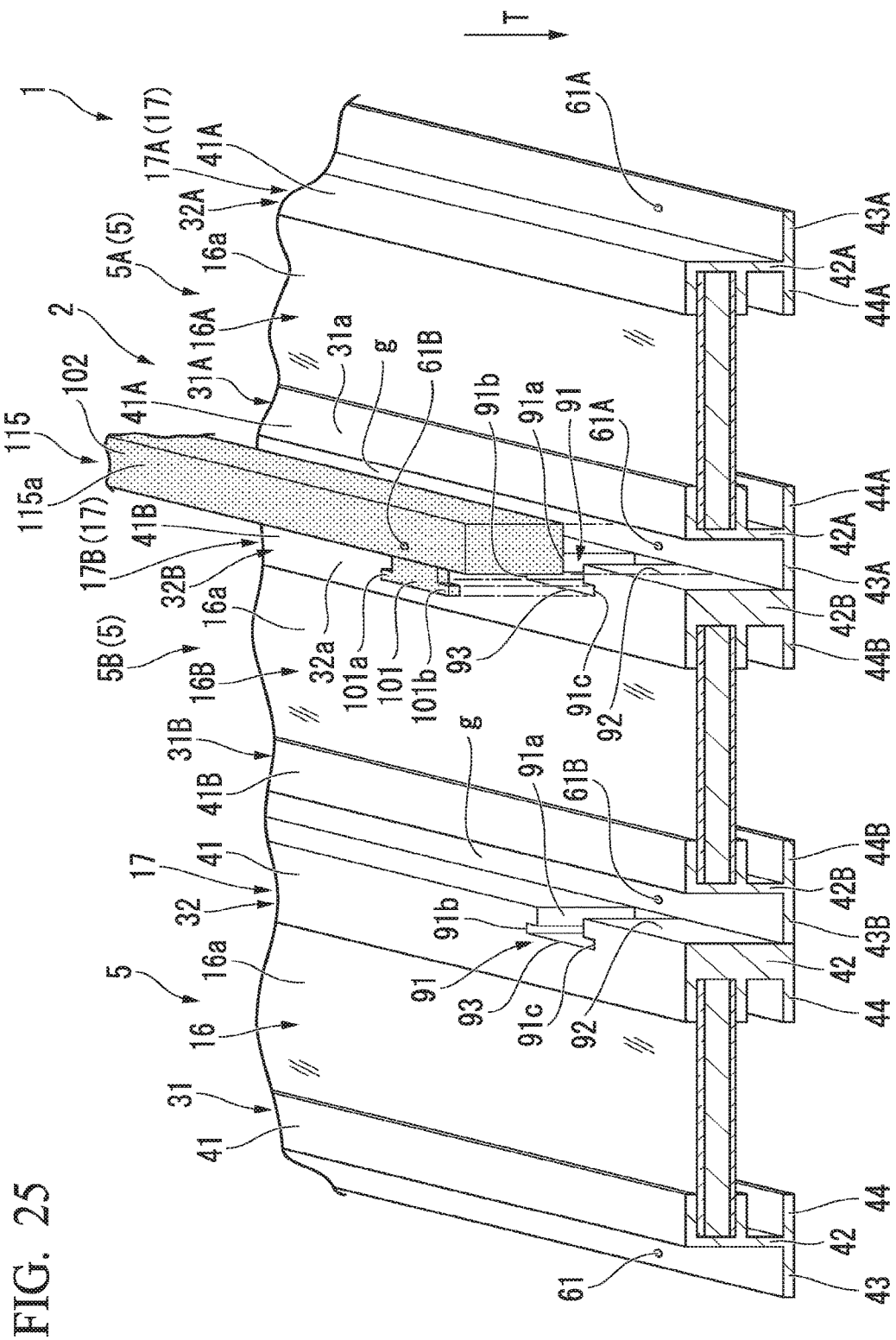
FIG. 25 is a perspective view showing solar cell modules of a ninth embodiment.

As shown in FIG. 25, the main attachment section 43B of the second member 32B of the second solar cell module 5B of the embodiment includes a gap filling section (a sealing section) 115. The gap filling section 115 is inserted into the gap g between the first member 31A of the first solar cell module 5A and the second member 32B of the second solar cell module 5B when the main attachment section 43B is inserted into the groove 91. The gap filling section 115 fills at least a part of the gap g between the first member 31A and the second member 32B. The gap filling section 115 is a hollow member formed of aluminum, for example.

For example, the gap filling section 115 has a length throughout substantially the length of the gap g between the first member 31A and the second member 32B in the longitudinal direction of the second member 32B. In addition, the gap filling section 115 is formed to have a relatively large thickness in the panel thickness direction T. For example, the gap filling section 115 adjoins the support section 41A of the first member 31A and the support section 41B of the second member 32B in a direction crossing the panel thickness direction T (for example, a direction substantially parallel to the front surface 16a of the solar panel 16) in a state that the main attachment section 43B of the second member 32B is in contact with the main attachment section 43A of the first member 31A. In other words, at least a part of the gap filling section 115 is disposed between the support section 41A of the first member 31A and the support section 41B of the second member 32B in a state that the main attachment section 43B of the second member 32B is in contact with the main attachment section 43A of the first member 31A.

In one example, the gap filling section 115 has substantially the same thickness as the entire height of the gap g between the first member 31A and the second member 32B in the panel thickness direction T. That is, in a state that the main attachment section 43B of the second member 32B is in contact with the main attachment section 43A of the first member 31A, a surface (an upper surface) 115a of the gap filling section 115 is substantially flush with a surface (an upper surface) 31a of the first member 31A and a surface (an upper surface) 32a of the second member 32B. Accordingly, one plane is formed throughout the first solar cell module 5A and the second solar cell module 5B. Further, the surface 31a of the first member 31A and the surface 32a of the second member 32B are surfaces exposed in an opposite direction of the stand 6.

As described above, in the embodiment, the main attachment section 43B (a second attachment section) of the second member 32B of the second solar cell module 5B includes the gap filling section 115. The gap filling section 115 is disposed between the support section 41A (a first support section) of the first member 31A of the first solar cell module 5A and the support section 41B (a second support section) of the second member 32B of the second solar cell module 5B in a state that the main attachment section 43B of the second member 32B of the second solar cell module 5B is in contact with the main attachment section 43A (a first attachment section) of the first member 31A of the first solar cell module 5A. The gap filling section 115 fills at least a part of the gap g between the first member 31A of the first solar cell module 5A and the second member 32B of the second solar cell module 5B.

According to the above-mentioned configuration, since at least a part of the gap g between the first solar cell module 5A and the second solar cell module 5B is hidden by the gap filling section 115, a design property of the solar power generation system 1 can be improved. In addition, since at least a part of the gap g between the first solar cell module 5A and the second solar cell module 5B is filled, a sliding-down property of snow accumulated on the solar cell modules 5 is improved. In addition, as the gap filling section 115 is formed as a portion of the main attachment section 43B, in comparison with the case in which an exclusive part configured to cover the gap g between the first solar cell module 5A and the second solar cell module 5B is provided, reduction in the number of parts can be achieved.

(Variant)

Figure 26:
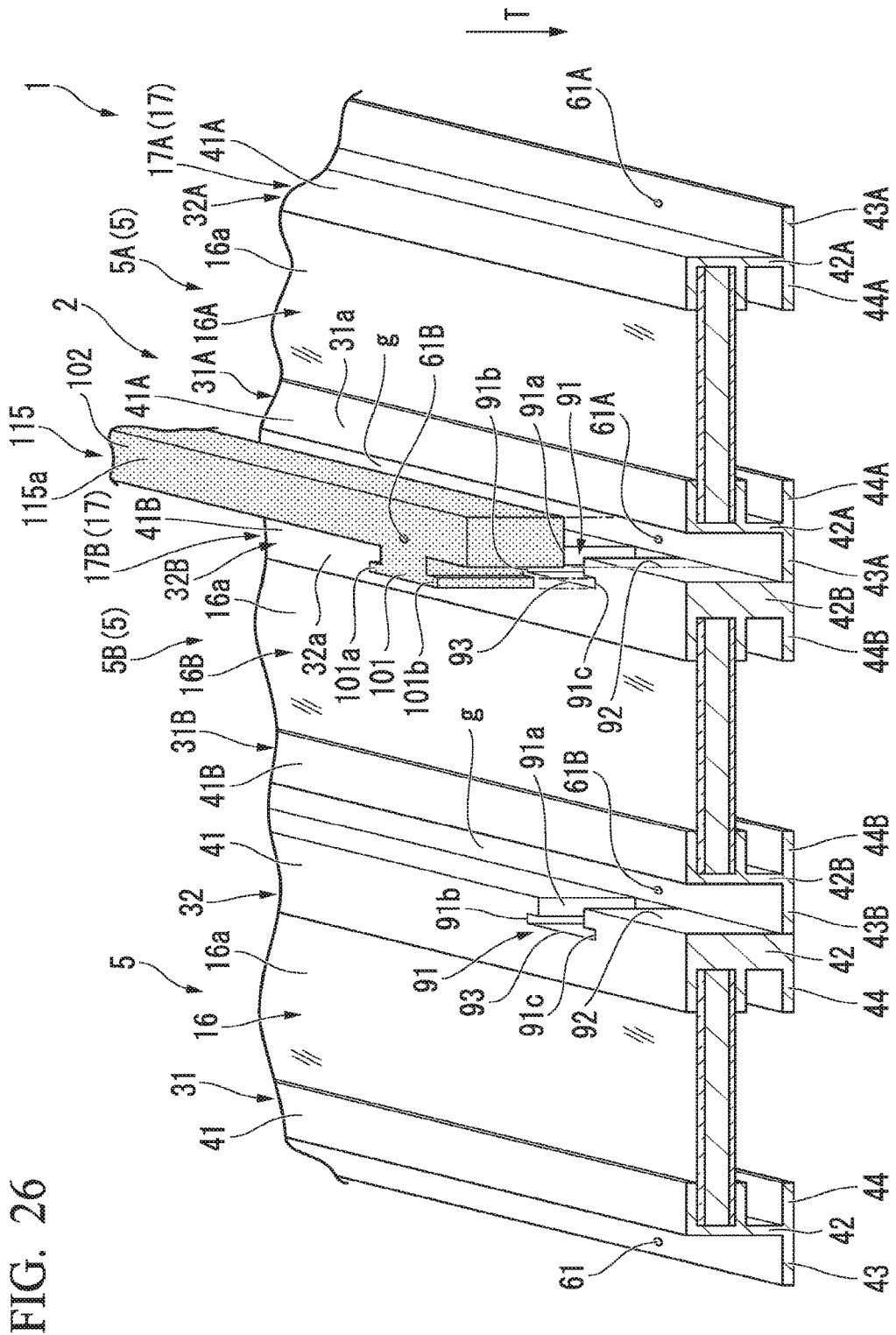
FIG. 26 is a perspective view showing a variant of the solar cell modules of the ninth embodiment.

FIG. 26 shows one variant of the ninth embodiment.

In the variant shown in FIG. 26, the insertion section 101 of the main attachment section 43B inserted into the groove 91 has substantially the same thickness as the gap filling section 115 in the panel thickness direction T.

According to the above-mentioned configuration, flatness between the first solar cell module 5A and the second solar cell module 5B is further improved. For this reason, a design property, a snow sliding-down property, and so on, is further improved.

TENTH EMBODIMENT

Next, a tenth embodiment will be described with reference to FIG. 27. The embodiment has a structure in which the insertion section 101 and the gap filling section 115 of the second solar cell module 5B are integrally formed with the first member 31A of the first solar cell module 5A in the variant (FIG. 26) of the ninth embodiment. Note that, the other configurations of the embodiment are the same as the configurations of the variant of the ninth embodiment. Further, in the description of the variant, for the convenience of description, an example in which the groove 91 is formed in the first solar cell module 5A and the main attachment section 43 inserted into the groove 91 is integrally formed with the second solar cell module 5B (that is, an example in which a configuration of the first solar cell module 5A and the second solar cell module 5B is inverted with respect to the variant (FIG. 26) of the ninth embodiment) will be described.

Figure 27:
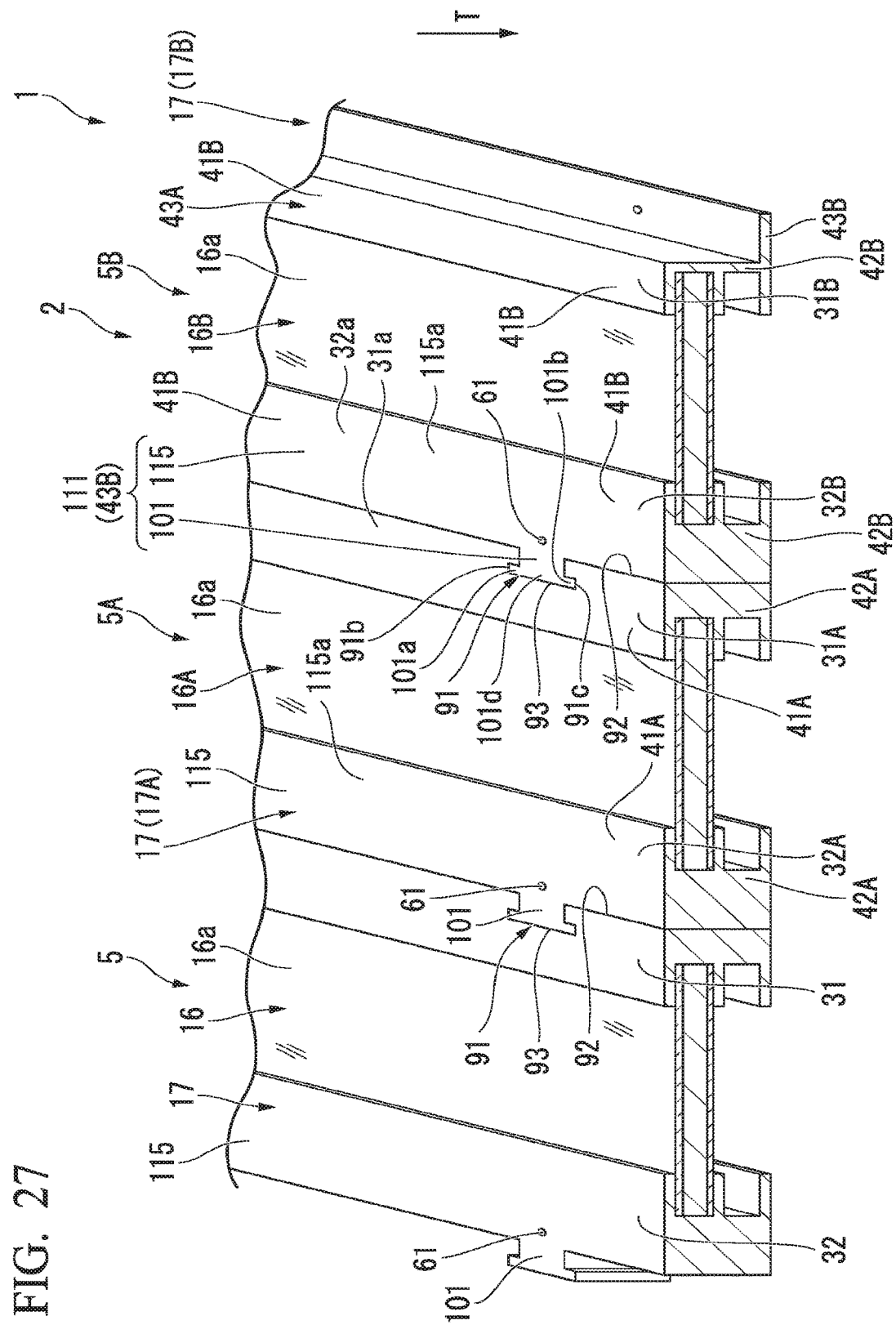
FIG. 27 is a perspective view showing solar cell modules of a tenth embodiment.

FIG. 27 shows the plurality of solar cell modules 5 of the embodiment.

As shown in FIG. 27, in the embodiment, the first member 31A of the first solar cell module 5A has the groove 91. Further, in the embodiment, the main attachment section 43A of the first member 31A of the first solar cell module 5A may not have the hole 61.

On the other hand, the second member 32B of the second solar cell module 5B includes the suppressing section 111 that functions as an example of the main attachment section 43B. The suppressing section 111 is integrally formed with the support section 41B and the erection section 42B of the second member 32B of the second solar cell module 5B. The suppressing section 111 has substantially the same configuration as the main attachment section 43B of the variant (see FIG. 26) of the ninth embodiment. For example, the suppressing section 111 includes the insertion section 101 and the gap filling section (the sealing section) 115. A surface (an upper surface) 101d of the insertion section 101 and a surface (an upper surface) 115a of the gap filling section 115 are substantially flush with the surface (the upper surface) 31a of the first member 31A and the surface (the upper surface) 32a of the second member 32B in a state that the main attachment section 43B of the second member 32B of the second solar cell module 5B is in contact with the main attachment section 43A of the first member 31A of the first solar cell module 5A. Accordingly, one plane is formed throughout the first solar cell module 5A and the second solar cell module 5B.

When seen from another viewpoint, the tenth embodiment provides the suppressing section 111 having a thickness for the surface (the upper surface) of the suppressing section 111 (the main attachment section 43B) to be substantially flush with the surface (the upper surface) 31a of the first member 31A and the surface (the upper surface) 32a of the second member 32B in the variant (FIG. 24) of the eighth embodiment.

As described above, in the embodiment, the insertion section 101 and the gap filling section (the sealing section) 115 are integrally formed with the frame 17. Accordingly, reduction in the number of fixing parts configured to fix the solar cell modules 5 and reduction in the number of attachment processes of the fixing parts can be achieved.

ELEVENTH EMBODIMENT

Next, an eleventh embodiment will be described with reference to FIG. 28. The embodiment is different from the configuration of the variant of the ninth embodiment in that the gap filling section 115 protrudes above the front surface (the light receiving surface) 16a of the solar panel 16. Note that, the other configurations of the embodiment are the same as the configurations of the variant of the ninth embodiment.

Figure 28:
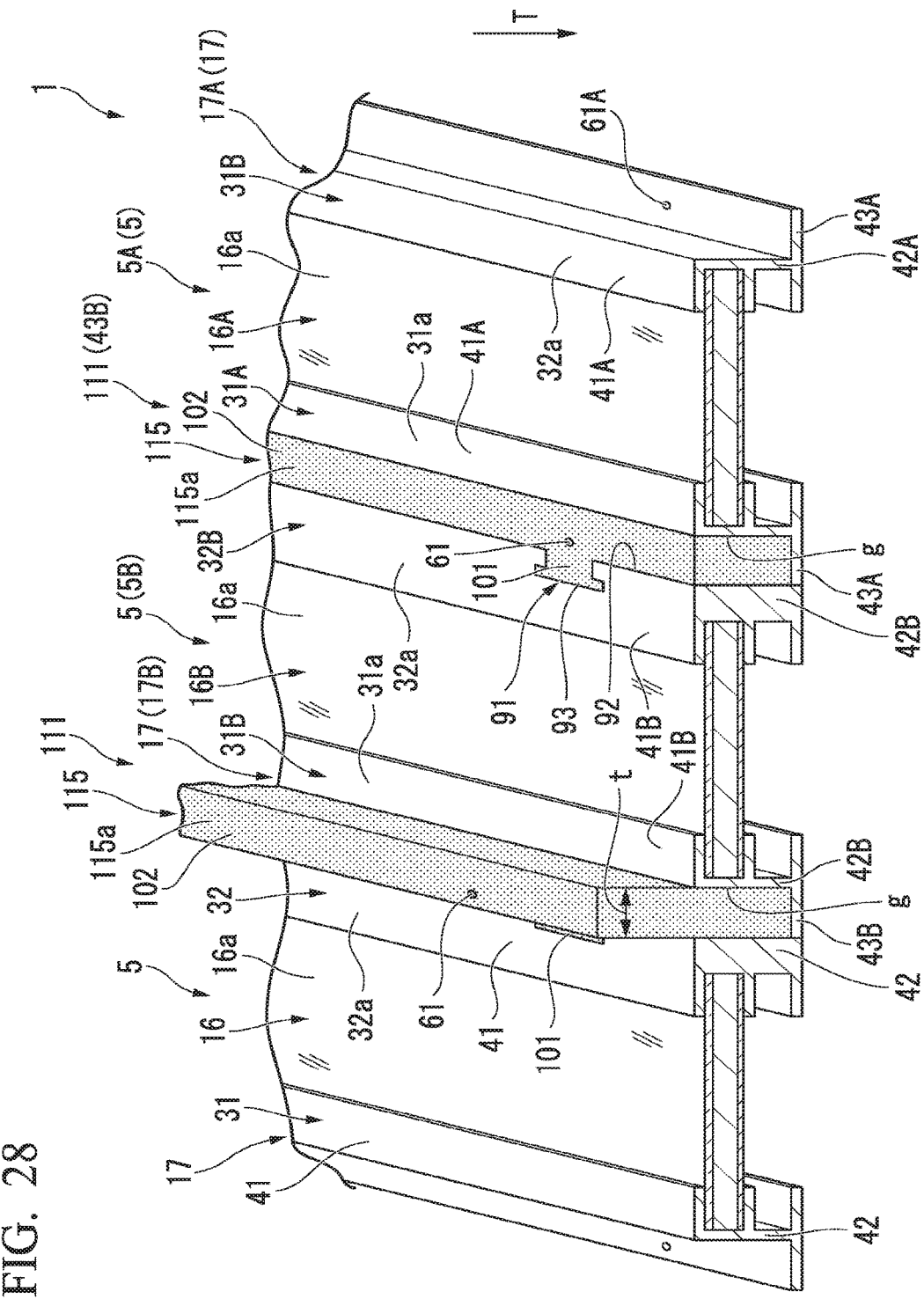
FIG. 28 is a perspective view showing solar cell modules of an eleventh embodiment.

FIG. 28 shows the plurality of solar cell modules 5 of the embodiment.

As shown in FIG. 28, in the embodiment, at least one of the gap filling sections 115 protrudes above the front surface (the light receiving surface) 16a of the solar panel 16. For example, the gap filling section 115 protrudes above the front surface 16a of the solar panel 16 by a distance larger than a thickness t in the horizontal direction of the gap filling section 115. Further, "the thickness t in the horizontal direction of the gap filling section 115" is, for example, a thickness in a direction substantially perpendicular to the longitudinal direction of the gap filling section 115. From another viewpoint, at least one of the gap filling sections 115 protrudes above the surface (the upper surface) 31a of the first member 31A and the surface (the upper surface) 32a of the second member 32A of the first solar cell module 5A. For example, the gap filling section 115 protrudes above the surface (the upper surface) 31a of the first member 31A and the surface (the upper surface) 32a of the second member 32A of the first solar cell module 5A by a distance larger than the thickness t in the horizontal direction of the gap filling section 115. The gap filling section 115 is disposed in, for example, a direction crossing the direction in which snow slides off the roof of a house or the like.

Here, for example, on a roof in an urban area in a heavy snow fall region, in order to suppress snow from sliding down, a snow guard metal fitting may be installed. In the embodiment, since the gap filling section 115 protrudes above the front surface (the light receiving surface) 16a of the solar panel 16, snow can be suppressed from sliding down by the gap filling section 115. That is, the number of snow guard metal fittings can be reduced or the snow guard metal fittings may be omitted due to the gap filling section 115 of the embodiment.

(Variant)

As in the eleventh embodiment, the gap filling section 115 protruding above the front surface (the light receiving surface) 16a of the solar panel 16 is integrally formed with the frame 17 as in the tenth embodiment. That is, at least a part of the suppressing section 111 inserted into the groove 91 in the tenth embodiment may protrude above the front surface (the light receiving surface) 16a of the solar panel 16. When seen from another viewpoint, the suppressing section 111 may protrude above the surface (the upper surface) 31a of the first member 31A of the first solar cell module 5A and the surface (the upper surface) 32a of the second member 32A.

While the first to eleventh embodiments and some variants have been described above, the embodiments and variants are not limited to the examples. For example, the configurations of the first to eleventh embodiments and some variants may be realized through combination or substitution thereof.

For example, in the first to eleventh embodiments, the directions in which the fastening members 66 are inserted may be vertically inverted.

In some of the embodiments described above, the plurality of solar cell modules 5 in which long sides of the solar panels 16 are adjacent to each other are fixed together by the fastening members 66. Instead of this, or in addition to this, the plurality of solar cell modules 5 in which short sides of the solar panels 16 are adjacent to each other may be fixed together by the fastening members 66. That is, the first member 31 and the second member 32 may also be members along the short sides of the solar panels 16. In addition, the grooves 91 may also be formed in the support members formed along the short sides of the solar panels 16.

According to at least one of the embodiments described above, the solar panel support unit includes the first support member, the second support member, and the third support member. The first support member includes the first support section and the first attachment section. The first support section is configured to support the first solar panel. The first attachment section is disposed at a position spaced by a first distance from the first support section and has the first hole. The second support member includes the second support section and the second attachment section. The second support section is configured to support the second solar panel. The second attachment section is disposed at a position spaced by the second distance, which is smaller than the first distance, from the second support section, has the second hole in communication with the first hole, and overlaps the first attachment section. The third support member includes the third support section and the third attachment section. The third support section is configured to support the third solar panel. The third attachment section has the third hole in communication with the first hole and the second hole and overlaps the second attachment section. According to the above-mentioned configuration, reduction in the number of fixing parts can be achieved.

Hereinafter, some examples of the solar panel support unit and the solar power generation system will be supplementarily stated.

[1] A solar panel support unit including:

a first support member including a first support section and a first attachment section, the first support section being configured to support a first solar panel, the first attachment section being disposed at a position spaced by a first distance from the first support section in a panel thickness direction of the first solar panel, and the first attachment section having a first hole; and a second support member including a second support section and a second attachment section, the second support section being configured to support a second solar panel, the second attachment section being disposed at a position spaced by a second distance, which is smaller than the first distance, from the second support section in the panel thickness direction, the second attachment section having a second hole to be in communication with the first hole, and the second attachment section being configured to overlap the first attachment section.

[2] The solar panel support unit according to [1], wherein
the first attachment section is to be disposed on a stand,
the second attachment section overlaps the first attachment section from an opposite side of the stand, and
the first attachment section and the second attachment section are jointly fastened to the stand by a fastening member inserted into the first hole and the second hole.

[3] The solar panel support unit according to [1], wherein
each of the first solar panel and the second solar panel includes a plurality of solar cells, a sealing material configured to seal the plurality of solar cells, a light transmission panel overlapping the sealing material, and a back sheet overlapping the scaling material from an opposite side of the light transmission panel,
the first support member forms at least a part of a frame holding the sealing material, the light transmission panel and the back sheet of the first solar panel, and
the second support member forms at least a part of a frame holding the sealing material, the light transmission panel and the back sheet of the second solar panel.

[4] The solar panel support unit according to [1], wherein
at least one of the first hole and the second hole is a long hole.

[5] The solar panel support unit according to [1], further including
a third support member including a third support section and a third attachment section, the third support section being configured to support a third solar panel, the third attachment section being disposed at a position spaced by a third distance, which is smaller than the second distance, from the third support section in the panel thickness direction, the third attachment section having a third hole to be in communication with the first hole and the second hole, and the third attachment section is configured to overlap the second attachment section.

[6] The solar panel support unit according to [5], further including
a fourth support member including a fourth support section and a fourth attachment section, the fourth support section being configured to support a fourth solar panel, the fourth attachment section being disposed at a position spaced by a fourth distance, which is smaller than the third distance, from the fourth support section in the panel thickness direction, the fourth attachment section having a fourth hole to be in communication with the first hole, the second hole and the third hole, and the fourth attachment section is configured to overlap the third attachment section.

[7] The solar panel support unit according to [1], wherein
the second support member has a groove along the panel thickness direction, and
the second attachment section is formed separately from the second support section, at least a part of the second attachment section is inserted into the groove, and the second attachment section is configured to be slidably movable along the groove.

[8] The solar panel support unit according to [7], wherein
the groove is opened to the outside of the second support member in the panel thickness direction.

[9] The solar panel support unit according to [7], wherein
the second attachment section includes a gap filling section disposed between the first support section and the second support section and configured to fill at least a part of a gap between the first support member and the second support member in a state that the second attachment section is in contact with the first attachment section.

[10] A solar panel support unit including:
a first support member including a first support section and a groove, the first support section being configured to support a first solar panel, and the groove being in a panel thickness direction of the first solar panel; and
a second support member including a second support section and a suppressing section, second support section being configured to support a second solar panel, and at least a part of suppressing section being inserted into the groove, and the suppressing section facing the first support member in the panel thickness direction.

[11] A solar power generation system including:
a first solar panel;
a second solar panel;
a first support member including a first support section and a first attachment section, the first support section being configured to support the first solar panel, the first attachment section being disposed at a position spaced by a first distance from the first support section in a panel thickness direction of the first solar panel, and the first attachment section having a first hole; and
a second support member including a second support section and a second attachment section, the second support section being configured to support the second solar panel, the second attachment section being disposed at a position spaced by a second distance, which is smaller than the first distance, from the second support section in the panel thickness direction, the second attachment section having a second hole to be in communication with the first hole, and the second attachment section being configured to overlap the first attachment section.

While certain embodiments of the invention have been described, these embodiments have been presented by way of example only, and are not intended to limit the scope of the inventions. Indeed, these embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

1 . . . a solar power generation system, 2 . . . a solar panel support unit, 6 . . . a stand, 16 . . . a solar panel, 16b . . . a rear surface of a solar panel, 17 . . . frame, 21 . . . a solar cell, 23 . . . a front panel (light transmission panel), 31 . . . a first member, 32 . . . a second member, 33 . . . a third member, 34 . . . a fourth member, 41 . . . a support section, 41s . . . a support surface, 43 . . . a main attachment section (attachment section), 61 . . . a hole of an attachment section, 65 . . . a hole of the stand, 66 . . . fastening member, 71 . . . a spacer, 91 . . . a groove, 111 . . . a suppressing section, 115 . . . a gap filling section, 201 . . . a first identification, 202 . . . a second identification, 203 . . . a third identification, 204 . . . a fourth identification, 211, 212, 213, 214 . . . identifications, 231, 232, 233, 234 . . . inclined portions, T . . . a panel thickness direction, L1 . . . a first distance, L2 . . . a second distance, L3 . . . a third distance, L4 . . . a fourth distance.

The invention claimed is:
1. A solar panel support unit comprising:
a first support member comprising a first support section and a first attachment section, the first support section being configured to support a first solar panel, the first attachment section being disposed at a position spaced by a first distance from the first support section in a panel thickness direction of the first solar panel, and the first attachment section having a first hole;

a second support member comprising a second support section and a second attachment section, the second support section being configured to support a second solar panel, the second attachment section being disposed at a position spaced by a second distance from the second support section in the panel thickness direction, the second distance being smaller than the first distance, the second attachment section having a second hole to be in communication with the first hole, the second attachment section being to overlap with the first attachment section; and a third support member comprising a third support section and a third attachment section, the third support being configured to support a third solar panel, the third attachment section having a third hole to be in communication with the first hole and the second hole, and the third attachment section being to overlap the second attachment section.

2. The solar panel support unit according to claim 1, wherein
the third attachment section is disposed at a position spaced by a third distance from the third support section in the panel thickness direction, and the third distance is smaller than the second distance.

3. The solar panel support unit according to claim 2, further comprising:

a fourth support member comprising a fourth support section and a fourth attachment section, the fourth support section being configured to support a fourth solar panel, the fourth attachment section being disposed at a position spaced by a fourth distance from the fourth support section in the panel thickness direction, the fourth distance being smaller than the third distance, the fourth attachment section having a fourth hole to be in communication with the first hole, the second hole and the third hole, and the fourth attachment section being to overlap the third attachment section.

4. The solar panel support unit according to claim 1, wherein
the first attachment section has a first identification,
the second attachment section has a second identification that is visually different from the first identification, and
the third attachment section has a third identification that is visually different from the first identification and the second identification.

5. The solar panel support unit according to claim 1, wherein the third attachment section is disposed at a position spaced by the first distance from the third support section in the panel thickness direction, and the third attachment section overlaps the second attachment section in a state that a light receiving surface of the first solar panel and a light receiving surface of the second solar panel are disposed at different levels.

6. A solar power generation system comprising:
a first solar panel;
a second solar panel;
a third solar panel;
a first support member comprising a first support section and a first attachment section, the first support section being configured to support the first solar panel, the first attachment section being disposed at a position spaced by a first distance from the first support section in a panel thickness direction of the first solar panel, and the first support section having a first hole;

a second support member comprising a second support section and a second attachment section, the second support section being configured to support the second solar panel, the second attachment section being disposed at a position spaced by a second distance from the second support section in the panel thickness direction, the second distance being smaller than the first distance, the second attachment section having a second hole to be in communication with the first hole, and the second attachment section being to overlap the first attachment section; and a third support member comprising a third support section and a third attachment section, the third support section being configured to support the third solar panel, the third attachment section having a third hole to be in communication with the first hole and the second hole, and the third attachment section being to overlap the second attachment section.

* * * * *